US005640446A

United States Patent [19]
Everett et al.

[11] Patent Number: 5,640,446
[45] Date of Patent: Jun. 17, 1997

[54] SYSTEM AND METHOD OF VALIDATING SPECIAL SERVICE CALLS HAVING DIFFERENT SIGNALING PROTOCOLS

[75] Inventors: David Alan Everett, Fairfax; Gary Wayne Leopold, Cedar Rapids; George Michael Kult, Fairfield; Lee C. Seydel, Iowa City; Padmanabhan Vijay, Cedar Rapids, all of Iowa

[73] Assignee: MCI Corporation, Washington, D.C.

[21] Appl. No.: 431,519

[22] Filed: May 1, 1995

[51] Int. Cl.$^6$ ............... H04M 15/00; H04M 3/42; H04M 7/00; H04J 3/12
[52] U.S. Cl. ............... 379/115; 379/207; 379/230; 370/401; 370/467
[58] Field of Search ............... 379/111, 112, 379/113, 114, 115, 119, 144, 201, 207, 229, 230, 219, 196, 197; 370/76, 85.13, 110.1

[56] References Cited

U.S. PATENT DOCUMENTS

| 5,008,929 | 4/1991 | Olsen | 379/115 |
|---|---|---|---|
| 5,089,954 | 2/1992 | Rago | 379/229 |
| 5,333,185 | 7/1994 | Burke | 379/112 |
| 5,377,186 | 12/1994 | Wegner | 379/230 |
| 5,420,916 | 5/1995 | Sekiguchi | 379/230 |
| 5,436,957 | 7/1995 | McConnell | 379/207 |

Primary Examiner—Curtis Kuntz
Assistant Examiner—Vijay Shankar

[57] ABSTRACT

The present invention telecommunications system provides validation of authorization codes input by a user for placing a call from a service area of a first telecommunications service provider with a calling card issued by another telecommunications service provider. The present invention allows the subscriber to place a special service call irrespective of whether the signaling protocol of the first service provider is different from the service provider to which the subscriber is a customer of. If the protocol of one telecommunications service provider is indeed different from the other service provider, a gateway residing in an intelligent service network node would convert the signaling protocol of the first service provider into a signaling protocol that is compatible with the other service provider. Consequently, the first service provider can quickly validate the authorization code provided by the subscriber by sending a query to the service provider that issued the calling card to the caller by referencing the LIDB database of the latter service provider. To achieve the conversion of one protocol to another, a system that includes an ISN node having gateways, file servers, a monitoring system, and mainframes is used. The gateway inside the ISN node has a client application program interface (API) component, a translate/convert component, a transaction capabilities part (TCAP) component and a SS7 API component. These various components, together with other controlling and interface components, are able to convert a first signaling protocol, for example a SS7 protocol, into a second protocol, for example a network information distributed service (NIDS) sequenced packet protocol.

21 Claims, 23 Drawing Sheets

SYSTEM AND METHOD OF VALIDATING SPECIAL SERVICE CALLS HAVING DIFFERENT SIGNALING PROTOCOLS

This application relates to co-pending application entitled Calling Card Validation System And Method Therefor (Docket Number CDR-94-004C), having application Ser. No. 08/431,518 assigned to the same assignee as the instant invention and filed May 1, 1995. This application is further related to co-pending application entitled SS7 Gateway (Docket No. CDR-94-004B) having application Ser. No. 08/425,055, assigned to the same assignee of this application, and having a filing date of Apr. 19, 1995.

FIELD OF THE INVENTION

This invention relates to telecommunications and more particularly a method and system therefor of validating special service calls placed by a subscriber of a first telephone service provider in a geographical area, or a different country, where telephone services are provided by a different telephone service provider. This invention also relates to a gateway and a system for converting a first signaling protocol of a first telephone service provider to a second signaling protocol compatible with a different telephone service provider.

BACKGROUND OF THE INVENTION

Prior to the instant invention, when a subscriber of a particular telephone service provider, as for example a long distance carrier in the United States, were to travel to a foreign country such as for example Canada, if the subscriber wants to use a telephone card issued to him from his telephone service provider to make a special service call, such as for example an operator assisted call, he would hear a message from the local telephone service provider where he was placing the call that his telephone card could not be used. This is because the local telephone service provider has no means by which to check whether the account number entered by the subscriber is a valid number, as the database in which valid numbers (or invalid numbers) are stored for comparing with the subscriber's calling card number can only be accessed by the subscriber's telephone service provider. One of the reasons that there was no interaction between the different telephone service providers was that each telephone service provider may be using a different type of signaling protocol.

There is prior art dealing with the conversion of different protocols. For example, in U.S. Pat. No. 5,182,748, there is disclosed a converter for converting an X.25 protocol to an X.32 protocol. However, this protocol conversion system does not deal with validation, but rather deals with coupling an X.25 terminal apparatus to a conventional telephone network, an ISDN, or a PBX system.

Another network communication system that utilizes conversion of protocols is disclosed in U.S. Pat. No. 5,377,191. There, a CCITT X.400 protocol is converted to an X.25 protocol. This conversion system is intended to be utilized by PTTs (postal, telegraph and telephone) authorities.

There also exists in the prior art a system whereby if a subscriber of a particular telephone service provider were to place a call (using his calling card issued by his telephone service provider) from an area serviced by another telephone service provider, he could only make the call back to the area serviced by his own telephone service provider. Thus, the subscriber is not able to place calls to a destination that may only be a short distance from the call origination location if the telephone service for the destination is provided by a service provider other than the one that he subscribes to. To overcome this inefficiency, the subscriber may dial a 1-800 number provided to him by his telephone service provider to reach an operator of the service provider. The operator may then be able to connect the call placed by the subscriber. However, this method is time consuming and takes up a lot of the capacity of the communications network insofar as the entire call needs to be routed to the operator of the telephone service provider of the subscriber.

BRIEF DESCRIPTION OF THE PRESENT INVENTION

The present invention method and system therefor enable a telephone service provider to validate the account numbers of its subscribers even if the subscribers originate calls from locations that are outside the service area of the telephone service provider. More specifically, the present invention allows a subscriber to originate a call from an area serviced by another telephone service provider to a destination that may or may not be within the dialing area of the subscriber's telephone service provider. To achieve this, the present invention provides a gateway from which a query on the validity of an account number (or a number on a calling card issued by a service provider) can be routed from one telecommunications service provider to another even if the signaling protocols of the respective service providers are different.

In operation, if a subscriber of a first service provider were to place a call from an area serviced by a second service provider, and if the communications protocols of the respective service providers are different, upon receipt of a request for a special service call, the second service provider will output a query based on the account information provided thereto by the subscriber to the gateway. At the gateway, the signaling protocol related to the message query is converted to the signaling protocol compatible with the service provider of the subscriber. The converted protocol query is then forwarded to a particular server or database whereat the subscriber's account number is compared with the numbers stored in the database (be that a negative list or a positive list) so that a determination is made on whether the account number provided is valid. If the account number given is deemed valid, the service provider of the subscriber would send a response to the gateway, which again converts the response from the protocol of the service provider of the subscriber to the protocol of the service provider where the subscriber originated the call. The originating call service provider, upon receiving the response which indicates the account number to be valid and therefore it will get paid, will allow the special service call to be completed to its destination, even if the destination were to be a location somewhere within the service area of the originating call service provider. If the response is negative, the call would not be completed.

The gateway that converts the protocol of one service provider into a protocol compatible with a second service provider is but one major component of the calling card validation system. The other major components are the network information distributed service (NIDS) automated calling card service (ACCS), the billed number screening (BNS) service, the data distribution system (DDS) mainframe computer, and the VAX cluster console system (VCS).

As for the gateway, there resides therein a transaction capabilities application part (TCAP) translator/converter. This TCAP translator/converter further includes a number of modules, or programs, which enable the gateway to perform the translation and conversion of one protocol to another.

It is therefore an objective of the present invention to provide a system and method therefor of enabling a subscriber of a given telecommunications service provider to place a call from the service area of another telecommunications service provider by using the account number provided to him by the service provider that he subscribes to. The account number may be in the form of a calling card.

It is another objective of the present invention to enable a telecommunications service provider to validate the account numbers of its subscribers irrespective of where a subscriber is originating a special service call, so long as that subscriber has an account number that is deemed valid by the service provider.

It is yet another objective of the present invention to enable a telecommunications service provider to complete the call of someone who is not a subscriber of its service without incurring the risk that it is a fraudulent call or that it will not be paid.

It is yet a further objective of the present invention to provide a gateway that is capable of converting the signaling protocol of one telecommunications service provider to a protocol compatible with another telecommunications service provider so that queries from one may be answered with responses from the other.

It is still another objective of the present invention to provide a calling card validation system that incorporates as one of its components a gateway to convert communication messages having different protocols.

BRIEF DESCRIPTION OF THE DRAWINGS

The above mentioned objectives and advantages of the present invention will become apparent and the invention itself will be best understood by reference to the following description of embodiments of the invention taken in conjunction with the accompanying drawings, wherein.

DETAILED DESCRIPTION OF THE INVENTION

Figure 1:
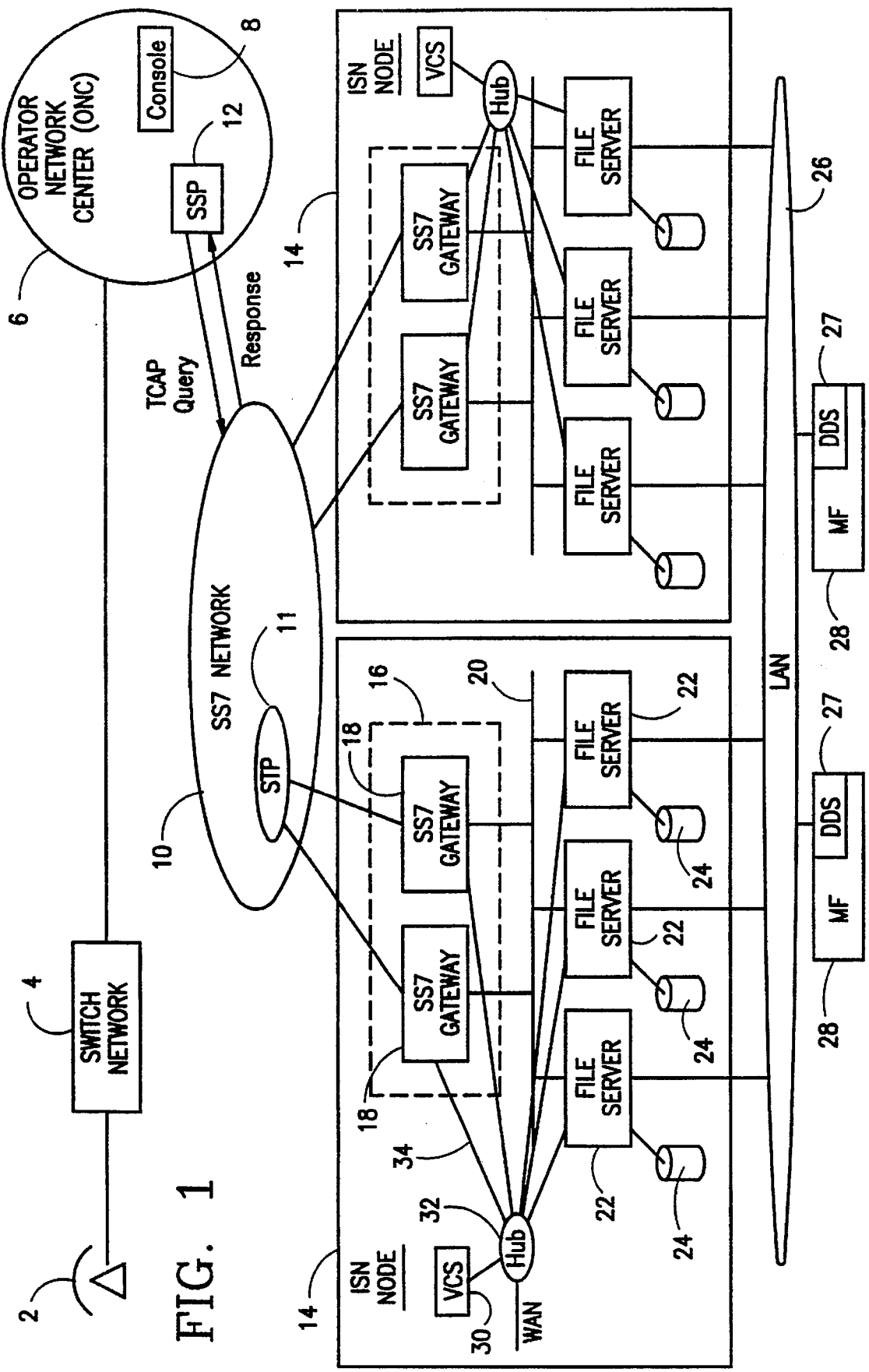
FIG. 1 is an overall view of the system of the instant invention from the perspective of a telecommunications service provider to both its "domestic" and "foreign" calls.

With reference to FIG. 1, a caller or subscriber at 2 originates a call to a switch network 4 of a telecommunications service provider. The call is identified as a special service call, for example an operator assisted call, and gets routed to an operator network center (ONC) 6. At ONC 6, the operator identifies the call as either a calling card call or a third party bill etc. Switch network 4, in the meantime, prompts the caller to provide an authorization code which may for example be a number on a credit card or a telephone calling card.

There are a number of consoles, designated 8, connected from ONC 6 to a ANSI SS7 network 10. For the FIG. 1 embodiment, the connection between network 10 and ONC 6 could be represented for example by a service switching point (SSP) 12.

As is well known, the SS7 network, as its name implies, utilizes a SS7 protocol which consists of four basic sub-protocols. These sub-protocols are: message transfer part (MTP) which provides the function of basic routing of signaling messages between signaling points; a signaling connection control part (SCCP) which provides additional routing and management functions for transfer of messages other than call set-up between the signaling points; an integrated services digital network (ISDN) user part (ISUP) which transfers call set-up signaling information between signaling points; and a transaction capabilities part (TCAP) which transfers non-circuit related information between the signaling points.

For the embodiment shown in FIG. 1, presume that the caller at 2 is not a subscriber of the telecommunications service provider of ONC6. In other words, take for example a business person who had travelled from the United States to a foreign country such as for example Canada. Now further suppose that the business person has carried with him a telephone card that was provided to him by the telecommunications service provider that he subscribes to in the United States. Now insofar as the service provider in the United States has no substantial relationship with the telecommunications service provider at whose service area the caller is originating his call, prior to the instant invention, no calls being placed by the caller using the telephone card provided to him by the service provider that he subscribes to will be completed by the service provider of ONC 6. This is particularly true if the signaling protocols of the different telecommunications service providers are different, as for example between a Canadian telecommunications service provider and a United States telecommunications service provider.

For further discussion of FIG. 1, assume "domestic" calls are calls that originate and end at locations within the service area of a given telecommunications service provider, while "foreign" calls are calls that originate at a service area of one telecommunications service provider and end at a destination located at the service area of a different telecommunications service provider.

As was stated earlier, when a caller originates a call from location 2, the service provider within whose service area location 2 is would prompt the caller, per either an operator or voice recognition and verification equipment such as that disclosed in U.S. Pat. No. 5,127,043, the disclosure of which being incorporated herein by reference, to provide an authorization number such as for example the number imprinted on the telephone card provided to him by the telecommunications service provider that he is a subscriber of. Upon receipt of the authorization code or number, the service provider of ONC 6 makes a determination of whether or not that authorization code is one that it issued or is one that belongs to a different telecommunications service provider. In practice, such determination may be gleaned from the particular numbers of the authorization code. Thus, the service provider at whose service area the call originated would, upon receipt of the authorization code, know which service provider the caller is a subscriber of, or more precisely the service provider that is responsible for billing the subscriber and therefore would know whether or not the subscriber's authorization code is valid.

If a determination is made that the call is a domestic call rather than a foreign call, the service provider can quickly compare the authorization code with the numbers stored in one of its databases so as to determine whether or not the authorization code is valid, i.e. the call is not fraudulent. A completion of the call is then made if indeed the authorization code is found to be valid.

However, in the case where the call being placed is a foreign call, i.e. the caller being a subscriber of a service provider different from where the call originated, the service provider of the service area where the call originated would not have any inkling as to whether the call is valid or fraudulent. For that service provider, the safest thing for it to do is to refuse to make the connection, as is being done by a number of telecommunications service providers. Yet by refusing to complete the call, revenues are lost, as a percentage of the amount of the call, irrespective of which service provider the caller is a subscriber of, ends up with the service provider where the call originated and/or where the call terminated. Prior to the instant invention, even if they wanted to, some of the service providers cannot communicate with other service providers insofar as their signaling protocols are different.

To reduce this loss of revenue, a service provider needs to do the following: (1) be able to communicate with the caller's service provider; and (2) be able to communicate effectively even though the signaling protocols of the respective service providers may be different.

With reference to the FIG. 1 embodiment, assume the service provider whose service area includes location 2 where the call originated uses a SS7 protocol. Further assume that the service provider to which the caller is a subscriber of uses a different protocol, for example a NIDS (network information distributed service) sequenced packet protocol (NSPP).

As shown in FIG. 1, a communications path is effected between the two service providers by two intelligent services network (ISN) nodes 14. Since both ISN nodes are the same, only one of the nodes will be discussed. As shown, ISN node 14 has a point node 16 comprising two gateways 18 providing multiple connections to the SS7 network 10. Gateways 18 are each connected to a common ethernet rail 20. Sitting also on the ethernet rail 20 are a plurality of processors or file servers 22. Connected to each file server 22 is at least one store 24 such as for example a hard disk storage medium which contains a number of databases, including at least one for verifying the validity of the authorization numbers assigned to subscribers of the service provider. File servers 22 are further connected to a wide area network (WAN) 26, which in turn is tied to the data distributed system (DDS) 27 residing in each of a couple of identical mainframe computers 28 which may for example be IBM mainframes. WAN 26 could be a token ring system which allows data to flow between mainframes 28 and file servers 22 of ISN node 14. Connected to the respective gateways 18 and file servers 22 is a VAX cluster console system (VCS) 30, via a hub 32 and connections 34. Gateways 18 each comprise a computer system.

As noted above, each of the file servers 22 has a number of databases. To keep these databases in synchronization, mainframe 28, by means of DDS 27, updates the various databases in the ISN nodes 14 with a master database. In other words, once the master database of the mainframe computer 28 has been updated, it in turn will distribute its updated data to the various databases. As far as the ISN node is concerned, gateways 18 provide access to the database from the SS7 network 10. This enables the operators, or the automated system, at ONC 6 of the telecommunications service provider to access the databases 24 by continuing the use of its standard protocol (for example a TCAP protocol), without having to update its existing equipment, for domestic calls.

In the case where the authorization code used by the caller is from a "foreign" service provider, in order to prevent fraud, and inasmuch as the local service provider cannot determine whether the account number of the foreign card is valid, it needs to pass off the validation of the card by a "hand-over" to the service provider that issued the card. For the hand-over, instead of forwarding the complete call to the service provider that issued the foreign card which indubitably will require a substantial amount of the capacity of the network, the service switching point (SSP) 12 would only provide a query, in this instance a TCAP query, to the SS7 network 10. A conventional global title translation then takes place within the public telecommunications network 10 to determine where that query should be forwarded. In other words, if it is determined that the query should be sent to a particular ISN node 14, it is forwarded thereto.

Upon receipt by one of the gateways 18, the query is forwarded to the appropriate file server 22 which, upon retrieving the appropriate data from its appropriate database 24, makes a determination on whether the authorization code or account number is valid. If it is valid, a response is sent by file server 22 to gateway 18 which in turn forwards the response to the appropriate signaling transfer point (STP) 11 of network 10. From there the response is forwarded to SSP 12 of ONC 6. And authorization is then forwarded by ONC 6 to switch network 4 to complete the call from location 2 to its destination.

From FIG. 1, the basic card calling system (BCCS) of the instant invention is shown to be divided into four major components—namely gateways 18, servers 22, mainframes 28 and console 30.

In the system, call queries are directed to one of the gateways 18 in one of the ISN nodes 14 from a paired signal transfer point (STP) such as 11 shown in network 10. Transaction capabilities application part (TCAP) messages are translated by gateway 18 and passed to any one of file servers 22, in a round robin fashion, for processing, validation and response. After validation and processing, server 22 sends the response back to the gateway 18 via ethernet rail 20. Gateway 18 in turn transmits the response back to the query originator, via STP 11 and network 11 to ONC 6, for example.

ISN node 14 in essence acts as a generic service control point (SCP) with, as for example shown in the embodiment of FIG. 1, dual computer systems, acting as gateways 18, to provide a front end interface with the SS7 network. Putting it differently, each of gateways 18 provides an entry point for queries to ISN node 14 for both domestic and foreign cards and number validation.

Each gateway 18 has the following three major functions: (1) receives query data for validation and response; (2) sends alarm data to the VCS; and (3) collects operational measurements (OMs) and send the OMs to the server. Within each of the major functions are a number of sub-functions. For example, under function (1), upon receipt of the query from STP 11, the query has to be translated, reformatted, and sent over the local area network (LAN) to a file server (of the 3 shown in the FIG. 1 embodiment) containing the line information database (LIDB) used for validation. The gateway receives a response from the file server, which can be either a validated call data or an error message. This response is then reformatted and sent back to STP 11. More specifically, upon receipt of the SS7 query from STP 11, gateway 18 has to break down the layers of the SS7 protocol, for example the message transfer part (MTP) and signaling call connection part (SCCP) layers. In addition, in order to forward the query message to file server 22, the fields from the TCAP query have to be reformatted in a inter- network packet exchange (IPX)-LIDB query packet. When file server 22 has performed its validation, a response packet is sent therefrom to gateway 18. Gateway 18 would have to reconvert the response packet from the file server to a TCAP response. This TCAP response is then forwarded to STP 11 with the called number in the layer that also contains the calling party addresses in the original query.

Under gateway major function (2), an alarm is sent from gateway 18 to the console of VCS 30, when an error occurs in the gateway. As for major function (3), operation measurement (OM) data is collected during the gateway operation. This OM data is sent to file server 22 periodically.

With respect to the forwarding of queries from gateway 18 to file servers 22, it should be noted that each gateway would send the queries in a round robin fashion to the file servers 22. For example, if a targeted server is not available, a query would be routed to the next file server and, if necessary, the third file server. If all three file servers for the FIG. 1 embodiment are not available, the ISN node is declared out of service and the gateway will report to the SS7 network that no further queries can be accepted. In which case STP 11 will route future queries to the alternative ISN node 14. On the other hand, if the particular gateway in the ISN node fails to respond to the STP, the STP would route the queries over the alternate link to the alternate gateway in the ISN node.

File servers 22 provide the call processing functionality required to receive the LIDB queries from the gateway, validate the queries and respond to the gateway. All LIDB queries launched from the SS7 network (for both domestic and foreign card and billed number queries) are sent to file servers 22 for validation. Each of the file servers 22 may be an IBM RS/6000 computer, for example as was stated earlier. There are five major functions performed by the file server. They are: (1) validate the call data from the gateway; (2) update the database with information received from the mainframe computer, i.e. MF 28; (3) send alarm data to VCS 30; (4) collect OMs and send the same to the mainframe; and (5) generate service measurements (SMs) data as billing detailed records (BDRs) for fraud detection and send the SMs to the mainframe. In essence, for function (1), the file server, upon receipt of the call data from the gateway, will attempt to validate the call data using the appropriate database look-ups and system tables, and sends a response, which may be either a validation of the call data or an error message, back to the gateway.

Mainframe 28 provides the data repository and the maintenance distribution vehicle for all databases, as well as collecting and analyzing the data required for fraud detection, capability planning and performance analysis. Each of the mainframes shown in the FIG. 1 embodiment may be an IBM ES/9000 mainframe computer. The mainframe has five major functions: g(1) act as a data repository containing the master copy of all databases; (2) maintain a master copy of all of the databases; (3) distribute the database maintenance updates to all of the file servers and the other mainframe using the data distribution system (DDS) through a token ring network; (4) collect and retain general purpose statistics; and (5) perform data analysis using the fraud evaluation and reporting (FEAR) system. The FEAR system is disclosed in co-pending application 08/382,415 filed Feb. 2, 1995 and assigned to the same assignee as the instant invention. The disclosure of the '415 application is incorporated by reference herein.

VCS 30, i.e. the VAX cluster console system, performs various monitoring functions required for the BCCS system. The VCS 30 has three main functions, namely: (1) receive alarm data from the file servers and the gateways and transmit this data to the service provider's network monitoring systems; (2) provide a pass through access capability to the file servers and the gateways for maintenance activities and manual data gathering; and (3) provide a real time monitor display indicating the current general state of each monitored unit.

In terms of hardware, as was mentioned previously, each of the gateways may comprise a DEC VAX 4000/500 computer with the appropriate ethernet card to enable the same to be connected to the ethernet rail 20. It should of course be appreciated that accessory components such as hard disk drives, tape drives, ethernet transceivers, etc. are also needed for connecting the gateway to the ethernet rail. Insofar as each ISN node for the FIG. 1 embodiment has two gateways, two DEC VAX 4000/500 computers are used. Connecting the public telecommunications network, i.e. the SS7 network 10, to each of the ISN node 14 is a paired STP links, each connected to a corresponding gateway. These two links may constitute one linkset, i.e. the communication path between two points. Do note that each linkset can in fact comprise up to sixteen links.

For each ISN node 14 in the FIG. 1 embodiment there are three file servers 22, each being an IBM RS/6000, model 980B computer with ethernet and token ring cards. A copy of the LIDB database is resident in each of the servers within the ISN node. Each LIDB database may consist, for example, a number of files which contain the information used to validate automated calling card system (ACCS) and billed number queries. As shown in the FIG. 1 embodiment, the LIDB database, designated 24, is periodically updated as the DDS (residing on mainframe 28) forwards new information over the token ring network 26 to file server 22. These updates may be performed on a periodic basis for example once every 24 hour period. As shown in FIG. 1, file servers 22 and gateways 18 are connected by ethernet LAN 20 which may have an anticipated transmission rate of 10 mb/sec. NIDS (network information distributed services) communication processes provide the inter-network packet exchange (IPX) connection services and routing of the IPX (which uses the NSPP (NIDS sequenced packet protocol)) input and output. File servers 22 further send data records, such as for example BDRs, to mainframe 28 over network 26.

There are two IBM ES/900, model 580 mainframe computers 28 shown in the FIG. 1 embodiment of the instant invention. The two mainframes are used in a "primary" and a "secondary" relationship to provide full redundancy and to ensure the appropriate levels of availability. As was mentioned previously, some of the functions being performed by the mainframes include service order entry, billing detail records (BDRs), data distribution, and fraud evaluation and reporting.

Although not shown as such, the two mainframes 28 are connected by inter-system communication (ISC) links from front end processing to front end processing, i.e. FEP to FEP, which reside on the token ring network 26. Human machine interface (HMI) access by the operators of the service provider may be accomplished by means of terminals. Service updates are downloaded from the DDS master, which is resident on the mainframe, via the token ring network 26 to the file servers 22, and specifically to the LIDB databases thereof. BDRs detailing the validation results of queries are forwarded from file servers 22 to the DDS master resident on the mainframe for fraud detection, billing and other similar functions, for example.

VCS 30 is a DEC VAX 4000, model 90 device resident in each of the ISN nodes. Its purpose is to generate and report the goings on in the nodes, as it receives alarms and other data from both the gateways and file servers. As shown, VCS 30 is connected to the gateway and the file servers by a RS232 connection.

From the perspective of FIG. 1, the call processing of the basic calling card system (BCCS) provides not only high capacity call processing, but also a common approach to two types of validation/authorization: namely, automated calling card system (ACCS) and billed number screening (BNS). In brief, ACCS is a service that screens and validates incoming calls initiated using calling cards, whether the cards are owned by the subscribers of the service provider (domestic) or by subscribers of other service providers (foreign). BNS, on the other hand, is a service that provides the validation and screening required for third party and collect call environments.

An overall view of the call/query flow is given hereinbelow.

When a call is originated at location 2 and routed by switch network 4 to ONC 6, if a determination is made that there needs to be a query sent to the public telecommunications network, STP 11 would route the ACCS and the BNS queries to the appropriate ISN node, for example 14. The validation request, at this point in time, is in the form of a transaction capabilities application part (TCAP) message.

Upon receipt of the TCAP formatted validation request, gateway 18 would extract the TCAP data into a line information database (LIDB) query and forward it to file server 22 in an inter-network packet exchange (IPX) query packet.

File server 22, upon receipt of the LIDB query from gateway 18, now attempts to validate the query against the LIDB database 24, shown to be connected to server 22. It should be noted that LIDB database 24 may in actuality be resident in file server 22. The validation process that occurs for queries may be referred to as network information distribution service (NIDS) ACCS/BNS screening. Once the validation process has been completed, a LIDB response is created. That response may comprise a success message, a failure message, or a forward response, and is sent back to the gateway in an IPX packet.

When the gateway receives the LIDB IPX response from server 22, it reformats it into a TCAP formatted message and forwards it to the originator, for example ONC 6 or, in the case of a foreign query (to be discussed later), to the appropriate service provider whose LIDB database was queried.

Having given an overall view of the call processing flow, focus now to the specific types of call processing that take place in the system of the present invention.

Consider the query initiation. When a customer places a normal operator assisted call, for example 0+call, the call is routed to the service provider's alternate automatic billing system (AABS) to obtain the calling card number (CCN) and the associated personal identification number (PIN). The traffic operator position system (TOPS) switch then generates a calling card or billed number screening (BNS) validation query and forwards it to the appropriate ISN node. For example, the TOPS switch provides the translation type (TT), for example 253, plus the leading six digits of the card or the line number so that the STP can do the final global title translation (GTT). As is well known, a GTT is a translation of an address of the customer dialed digits that does not explicitly contain information that would allow the routing of the call in the SS7 signaling network. Thus, the STP does the final GTT for the query, inserts a destination point code (DPC) identifying which of the ISN nodes is to receive the query, and inserts a subsystem number (SSN), i.e. 253, into the called number in the signaling connection control part (SCCP) layer of the message. The query is then routed to the designated ISN node, for example 14, of BCCS system. For the instant embodiment, do note that specific TT and SSN designations have been defined to indicate "foreign", for example a SSN of 243, such that when such SSN designation is detected, the validation steps unique to foreign query processing would commence.

With respect to the query validation process, gateway 18 serves as the entry point to the ISN node 14 for all calling card or billed number screening queries. To do this, it receives the external TCAP formatted validation request and breaks down the SS7 message layers of the query. This front end process verifies the format and content of the TCAP formatted query, the message transfer part (MTP) and SSCP layers of each of the messages. If the TCAP message format is incomplete or invalid, the query is rejected and returned to the TOPS switch. On the other hand, if the TCAP message format is complete and valid, the query is extracted to form a LIDB query, which is forwarded to file server 22 in an IPX query/message packet for further validation and processing.

The file server receives the LIDB (IPX formatted) query from gateway 18. It attempts to validate the LIDB query against its LIDB database. Each query is validated in accordance with the validation process referred earlier as NIDS ACCS/BNS screening. Although there are some differences between the validation process for calling cards verses billed number screening, in general the query goes through the same process and either a normal or an error response is sent back to the gateway as an IPX packet. At the same time, the NIDS ACCS/BNS screening process also sends data such as operational measurements (OMs) and the various service measurements (SMs) in the billing detail record (BDR) format to mainframe 28.

Whether or not the query is ACCS or BNS, the first validation performed is to ensure that the IPX query packet received from the gateway is structurally valid. If it is not, the query is rejected. Otherwise, the validation process continues based on whether the query is a calling card or a billed number screening number query. The automated calling card system (ACCS) aspect of the query processing provides screening and validation required for incoming queries from calling card calls. Some of these screen and validation functions include, among others, a validation of the personal identification number/calling card number (PIN/CCN) such as PIN restrictions and service denial indicators on domestic cards against the calling card data resident in the ACCS database. Another validation process for the ACCS queries is the validation against foreign cards based on a foreign cards list. Other types of processes that may be performed on the ACCS queries include fraud detection, such as for example the above mentioned co-pending application, geographic restrictions based on the origination and/or termination numbers for the cards and the authorization codes on the cards, and the reporting to be sent to the mainframe 28 in the form of BDRs for further statistical analysis and reporting.

The billed number screen (BNS) aspect of the query processing provides validation required for incoming queries generated by third parties and collect call environments, such as for example coin telephones. The BNS queries are rejected at the point that the validation fails.

Once the validation process has been completed, a LIDB response is created by the server. The response is formatted as an IPX response packet and it may carry a success message, a failure message, or a forward responsive if the response is to a foreign query. This response packet is forwarded to the gateway.

Gateway 18, upon receipt of the LIDB query response from server 22, reformats the IPX response packet into a TCAP format message. And depending on whether the response is for a domestic or foreign query, the TCAP formatted message is forwarded to an operations protocol data unit (OPDU) with the call number in the SCCP layer containing the destination point code (DPC) and the SSN for the originator/requester. For a foreign response, the gateway sends the query to the appropriate foreign service provider, and more specifically to its associated LIDB database, for further validation.

Figure 2:
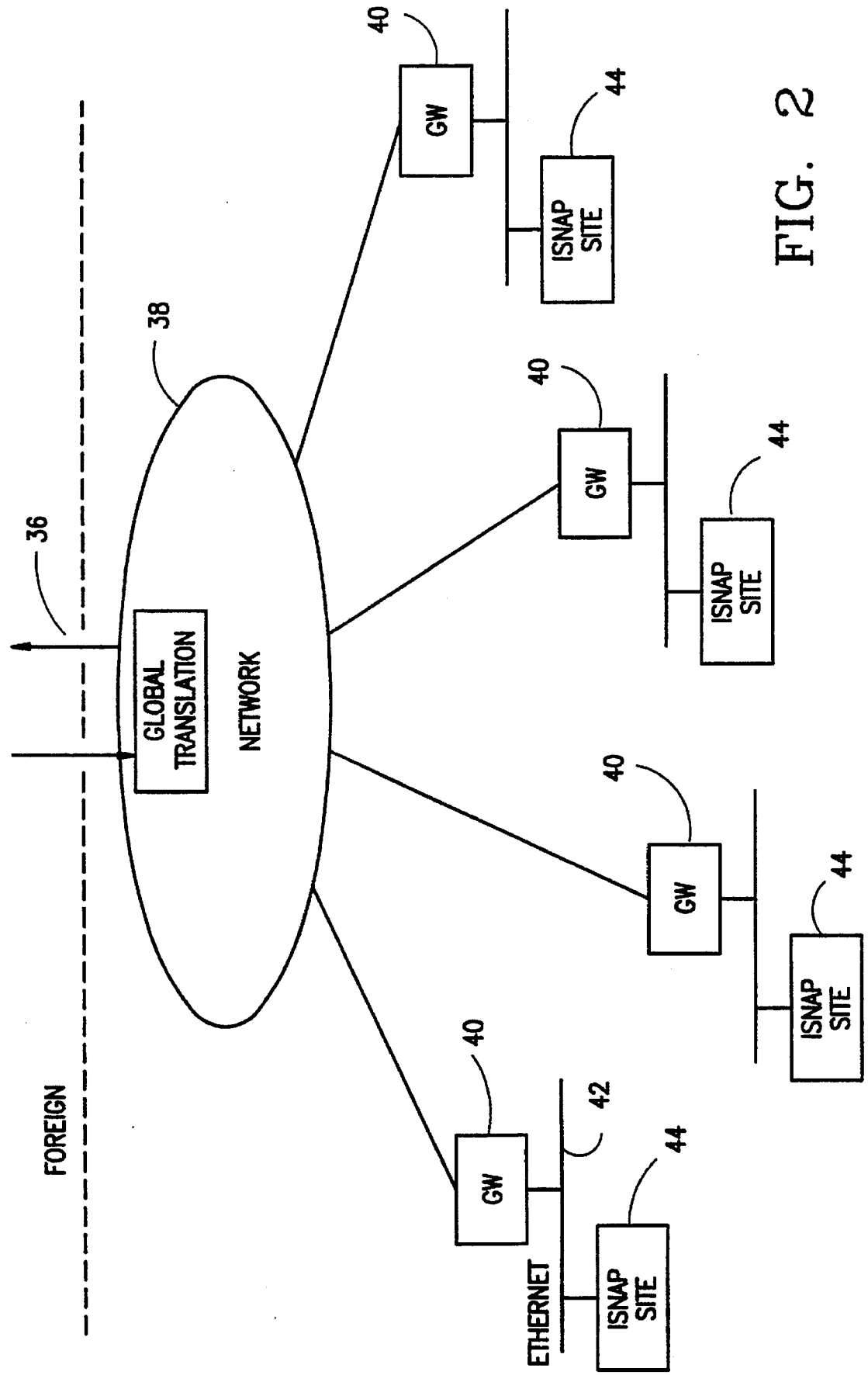
FIG. 2 is a simplified view of the present invention from the perspective of another telecommunications service provider in communication with the service provider of FIG. 1.

FIG. 2 illustrates a telecommunications service provider from the perspective of being a "foreign" provider whose subscriber has originated a call at a location in the service area of another service provider, such as that shown in FIG. 1. As far as the service provider of FIG. 2 is concerned, the service provider in whose service area the call originated at location 2 is now considered to be the foreign service provider. As shown, a linkset 36 provides the path through which communications are effected between the service provider and its foreign counterpart. A global translation is effected in the public communications network which, in this instance, may be one that is substantially different from the SS7 network 10 shown in FIG. 1. For illustration purposes, the network shown in FIG. 2 is designated 38.

For the FIG. 2 embodiment service provider, there are shown four separately located gateways 40 each connected to network 38. Each of the gateways 40 in turn is connected to an ethernet rail 42, so as to be communicatively coupled to a corresponding ISNAP (ISN application processor) site 44. Gateways 40 in FIG. 2 each function essentially the same as gateway 18 shown in FIG. 1, that is, it receives a query from network 38 which had been sent thereto via link 36 from the other service provider, which had determined that the call originating in its service area has an authorization code that needs to be validated from a "foreign" service provider. And similar to the gateways of FIG. 1, gateway 40, upon receipt of the query from network 38, would forward this query, so long as it has been formatted into the appropriate protocol, via ethernet LAN 42, to the ISNAP site 44.

Figure 3:
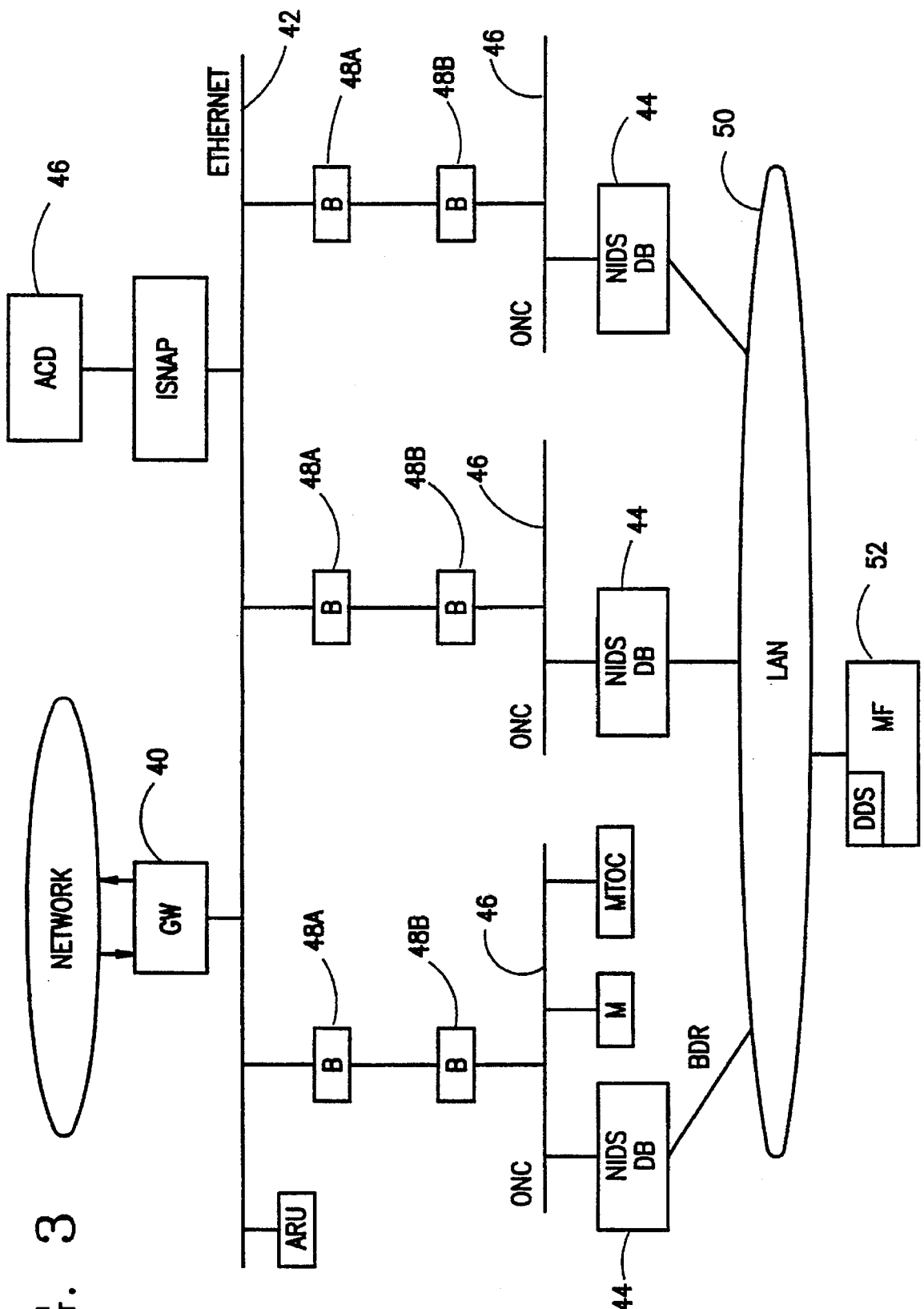
FIG. 3 is an overall view of the components for validating special service calls originated from a location not within the service area of a service provider.

A typical ISNAP 44 is shown in FIG. 3. As illustrated, each ISNAP site has an intelligent services network application processor (ISNAP) interfaced to an automatic call distributor (ACD) 46. Assuming that the query has been round robined to the gateway 40 shown in FIG. 3, the query is routed via ethernet rail 42 to any one of the NIDS databases 44 in a round robin fashion. As shown, gateway 40 is connected to the respective operator network control (ONC) rail 46 by way of bridges 48A and 48B. Connected to ONC rail 46 is the NIDS database 44, which in turn is connected to token ring 50. For the sake of simplicity, for the FIG. 3 embodiment, only mainframe computer 52 is shown to be connected to network 50. As was the case with the service provider of FIG. 1, data such as BDRs and fraudulent information transfer between NIDS database 44 and mainframe 52, which maintains the master database. NIDS database 44 of course provides the tables and numbers list that enable a determination to be made of whether the authorization code, or the telephone card, onto which the call originated from the other service provider is based, is valid.

Returning to FIG. 1, as was stated before, there are four major components of the BCC system of the instant invention. These major system components are namely, gateway 30, file server 22, mainframe 28, and VCS 30. Of those, gateway 20, file server 22 and VCS 30 are resident in ISN node 14.

Consider now the file servers, which, as stated before, may each comprise an IBM RS/6000 computer. In brief, the servers perform the call processing required to receive the LIDB queries from the gateways, validate the queries and provide responses back to the gateway. For the FIG. 1 embodiment, all LIDB queries, both domestic and foreign launched from ONC 6, are sent to one of the ISN nodes 14 for validation. Functionally, each file server validates the call queries using the appropriate database look up and system tables. After validation, the server would send a response, either a validation response or an error message, back to the gateway. The server further updates the database information received from mainframe 28 and sends any alarm data to VCS 30, when an error occurred in the server. In addition, operational measurements (OMs) are collected during the server operation, buffered, and periodically sent to mainframe 28. Do note that server OMs may also be received from the gateway. Lastly, each server would generate service measurements (SMs) as BDRs and sent to the mainframe for fraud detection.

As shown, each of the two ISN nodes 14 contains three file servers 22. For the embodiment of FIG. 1, the fact that there are three file servers 22 located within each ISN node 14 means that there is redundancy and excess capacity for handling incoming queries.

Each of file servers 22 contains a copy of the LIDB database which is essential to the ISN nodes operation. In particular, the LIDB database contains two database structures, the automated calling card service (ACCS) and the billed number service (BNS). The IPX protocol used in the ISN nodes provides the conductivity between gateways 18 and servers 22. The data distribution system (DDS) master database of mainframe 28 is accessed by file servers 22 by means of token ring 26. Synchronization of the databases in the file servers is provided by the master database in mainframe 28 which periodically updates the LIDB copies resident in the respective file servers.

In addition to standard software such as the advanced interactive executive (AIX) operating system and the conventional software utilized for the NIDS and the LIDB application, non-conventional processes are used for the operation of each of the file servers and its interaction to both the gateways and the mainframes. These processes are: NIDS control process, NIDS communication process, LIDB process, database process, and NIDS monitor process.

The NIDS control process provides internal timing and management of the NIDS processes. In essence, the NIDS control process receives a gateway originated request. The NIDS control process then performs the necessary internal processing of the request and then forwards the response to the NIDS communication process, which returns it to the gateway. The same internal processing is performed by the NIDS control process for requests received from the mainframe.

The NIDS communication process provides the IPX connection to external clients and provides the routing of the IPX inputs and outputs. In brief, upon receipt of the LIDB queries from the gateway, the NIDS communication process would direct the queries to the LIDB process (to be discussed later) which preforms the validation, creates the LIDB query responses and returns them to the NIDS communication process. The NIDS communication process then sends the LIDB query responses to the gateway. In addition, the NIDS communication process further receives from the gateway the OMs and directs them to the LIDB database and sends any OM responses received from the LIDB back to the gateway.

The LIDB process comprises a number of subprocesses for performing the validation of all LIDB queries. In essence, the LIDB subprocesses perform the validation and, if the database is corrupt, would detect such corruption and forward the same query to another file server for further processing. Responses obtained from the LIDB database are sent in the form of a LIDB response, in the appropriate protocol format, to the gateway.

The database process retrieves the database information for validation, temporarily stores the SMs in BDR format, the gateway and server OMs, and updates the LIDB database with updates from the mainframe. This is in response to the receipt of the database request from the LIDB process and the retrieval of the necessary database information. Upon processing, database response containing the requested information is returned to the LIDB process. In particular, the gateway OMs and SMs are collected from the LIDB process while the system OMs are collected from the NIDS monitoring process. The data is then sent to mainframe 28. A confirm request is also sent thereto for confirmation that the mainframe has received the data. When the mainframe has received the data, a confirm response is returned. Updated database information is then sent from the mainframe 28, in the form of database updates, to the database process to update the databases of the file servers. The database process is controlled by the NIDS control process and is closed when a closed service request is received therefrom. No response message is returned to the NIDS control process. Any alarm event generated from the database process is sent to the NIDS monitoring process.

The NIDS monitoring process collects and stores alarms to send to VCS 30, collects OMs to send to mainframe 28, and monitors the internal NIDS processing. The NIDS monitor process specifically receives alarm events from the NIDS communication process, the LIDB process, and the database process. These alarm events are screened and are sent as alarms to the VCS. The NIDS monitor process further creates system OMs which are sent to the database process. The above mentioned processes are performed within each of the ISN nodes which, when taken together, may be considered as the NIDS ACCS/BNS screening processes resident in file server 22.

The call processing flow relative to the file server is discussed hereinbelow. Specifically, the signal transfer point (STP) forwards a transaction capabilities application part (TCAP) queries/validation request to gateway 18 of the appropriate ISN node 14. The query at this time is, as was mentioned before, a TCAP formatted message. The gateway then extracts the TCAP data, by means of its TCAP translator/converter process (to be discussed later with reference to the gateway), to form a line information database (LIDB) query and forwards this query to the server in an IPX query packet.

Upon receiving the LIDB query from the gateway, the server would attempt to validate the query against the LIDB database which may be resident on the server, or may be external as for example per external database 24 shown in FIG. 1. The validation process that occurs for each of the queries is referred to as the network information distribution service (NIDS) ACCS/BNS screening. There are five subprocesses involved in the NIDS ACC/BNS screening. These are the NIDS control process, NIDS communication process, LIDB process, database process, and NIDS monitoring process.

The NIDS control process provides internal timing and management of the NIDS processes.

The NIDS communication process provides IPX connection services to external clients and the routing of IPX inputs and outputs.

The LIDB process performs the validation logic on all the LIDB queries by performing the following subprocesses: routing the ACCS/BNS queries to the appropriate application for performance; validating the ACCS queries by an ACCS related application; to the billed number screening validate validating the BNS queries with a billed number screening related application; and sending and receiving database queries and responses to and from the client process.

The database process is used to retrieve the database information for validation, to temporary store the SMs, gateway and server OMs, and to update the database with database updates from the mainframe.

The NIDS monitoring process collects and stores the alarms sent to the VCS, and collects OMs to send to the mainframe. In addition, the NIDS monitoring process monitors the internal NIDS processing. When the validation process has been completed, a LIDB query response is created and sent back to the gateway.

For the instant invention file server, there are three relevant databases resident on the server for call/query processing. These databases may be represented by the LIDB BNS file, the BNS screening file and the ACCS file. Although to be treated as being resident in the file server, these databases may in fact be stored in an external storage medium such as store 24.

The LIDB BSN file is accessed for domestic terminating code screening (DCS) and billed number screening (BNS). A specific format is provided for each of the records in the file which may include the line number, the country code, the company ID (for the service provider) etc.

The BNS screening file has incorporated therein the disallowed line number file, the foreign card screening file, and the telecredit file. It has a specific format that provides for a determination of the authorization codes, the line number, the credit card, the service provider card, 800 translation, call number screening, disallowed line number, foreign card screening and telecrediting.

The ACCS file has a record structure that is comprised of two parts, namely a fixed length block that contains static information and a variable length block that contains the data dependent on the card number. Such data element has a data tag component, a data length and data field component. The data tag is associated to a "tag table" for identifying the contents of the data field. The ACCS file format has a card number and an encrypted PIN portion.

The mainframe of the BCCS, as stated above, performs five main functions. To repeat, these functions are (1) to act as the data repository containing the master copy of all of the databases; (2) to maintain the master copy of all of the databases; (3) to distribute database maintenance updates to all of the servers and the other mainframe using data distribution system (DDS); (4) to collect and retain general purpose statistics; and (5) to perform data analysis using the fraud and evaluation response system (FEAR).

The processor acting as the mainframe is an IBM ES/9000-580, with the appropriate controllers, front end processors and storage medium. In addition, although not shown, consoles to provide system display and support are connected to the mainframe. To communicate with the file servers in the ISN nodes, as shown, a token ring network 26 is used.

The appropriate software for controlling the operation of the mainframe, and more particularly the interaction between the mainframe and the ISN node, includes the conventional operating system provided by the manufacturer of the mainframe. In terms of interaction between the file servers and the ISN nodes and the mainframes, having connected the two components with the token ring network 26, the data distribution system (DDS) performs the following functions. For maintenance, the DDS would add, delete and update the records in the distributed data sets maintained on the mainframe. When the data in the mainframe is changed, DDS would direct the mainframe to issue updates to all of the servers. Since the mainframe is the central repository of the data and also is in constant communication with the servers, the DDS also performs the functions of monitoring the goings on between the mainframe and the servers. One of the exemplar monitoring function is fraud monitoring to track excessive use of a billed number throughout the entire system. DDS also provides alerts when a connectivity problem occurs, such as for example when a server fails to acknowledge a message.

The DDS further controls the distribution and routing functions such as when the database maintained on the mainframe is to be updated. The routing and distribution functions of the DDS then create corresponding write messages for each of the servers and put updates in a service queue of each server so that the distributed databases on each of the file servers are exact copies of the master database residing in the mainframe.

Another function the DDS does is to send the databases to each server by delivering the database data in queues. This is because every process that involves communications between the mainframe and a server, or between a server and the mainframe, involves send and receive queues on each side. If there are multiple copies of a particular process, then there will be a set of queues for each copy.

The DDS is furthermore responsible for the function of collecting incoming messages from the servers and directing them to the proper file on the mainframe. In other words, if the six servers of FIG. 1 were to send collected messages to the mainframe as updates, the DDS would actually receive and acknowledge the updates. It then writes them to the correct file.

There are also a number of processes performed by the DDS. For the instant invention, the following processes are relevant: ACCS processing and LIDB BNS processing.

As was stated before, the ACCS application contains the data and the parameters required to provide calling card customers with the ability to bill long distance calls to a calling card with operator involvement while still supporting operator handled calls. The master copy of the ACCS database is in actuality maintained within the DDS and is therefore resident on the mainframe. Copies of the ACCS database are forwarded to each of the file servers for query processing, and are forwarded to as close to real time as possible. For the instant invention, it is suffice to note that the conventional calling card format is acceptable within ACCS, i.e. support of the existing 14 digit calling card format and the international 891 format.

The billed number screening (BNS) process provides the data and the parameters required for the validation aspects for third party and collect call environments. The master BNS database is maintained within the DDS and is therefore also resident on the mainframe. Copies of the BNS database are forwarded to the file servers for query processing, with the updates being provided to the servers in as close to real time as possible. The billed number format is NPA-NXX-XXXX, so as to comply with the conventional format. Albeit each mainframe communicates with the file servers, in order to keep the redundancy, the mainframes do interface with each other via the token ring network 26. Thus, exact copies of the various databases exist in each of the mainframes.

The VAX cluster control system (VCS 30) of the BCCS provides a central access and control point for the ISN nodes, as all console functions can be performed by the ISN node from a single terminal or VCS display. VCS collects the alarms generated by the components of the ISN node, defines the events which led to the alarms and the error conditions pertaining to the respective alarms. In essence, the VCS acts as a central collection source for collecting alarms for all error conditions and event logs sent thereto by the ISN nodes. To perform the collection and accumulation, the VCS would scan the incoming messages from the different components of the ISN nodes for specific text strings that may contain status or error information. All data received from the service nodes, i.e. the gateways and the servers, are logged by the VCS and any necessary alarm tabulations are performed and stored in the appropriate log files.

The last major component of the instant invention system is the gateway. As shown in FIG. 1, there are two gateways 18 in each of the ISN nodes 14. Each of the gateways includes two redundant DEC VAX series 4000/model 500 computers and their related software, network hardware and associated processes and features. In essence, the gateway's role within the intelligent service network (ISN) is to "switch" data into and out of the ISN node. More specifically, the gateway receives and transmits data from the public switched telephone network (PSTN) to the BCCS ISN environment. The gateway receives call queries from the PSTN and reformats the query packets into a form the ISN node can use. The gateway reverses this process for responses to the queries. The same point code (PC) is used for each of the two gateway devices within an ISN node. A mated service transfer point (STP) services the two VAX processors for each node. As was mentioned previously, each STP has two links, one going to each gateway. Each pair of links constitutes one linkset. The ISN node performs a generic service control point (SCP) processing. Queries are routed from the service provider's ONC to the gateway's front end interface.

As for the software component of the gateway, in addition to conventional processes, the gateway has a special series of modules or routines, which together enable it to convert queries with one type of signaling protocol into messages with another type of protocol. When a response is generated by the system, that response message is reconverted into the protocol of the particular query, so as to be returned to the originator of the query.

Figure 4:
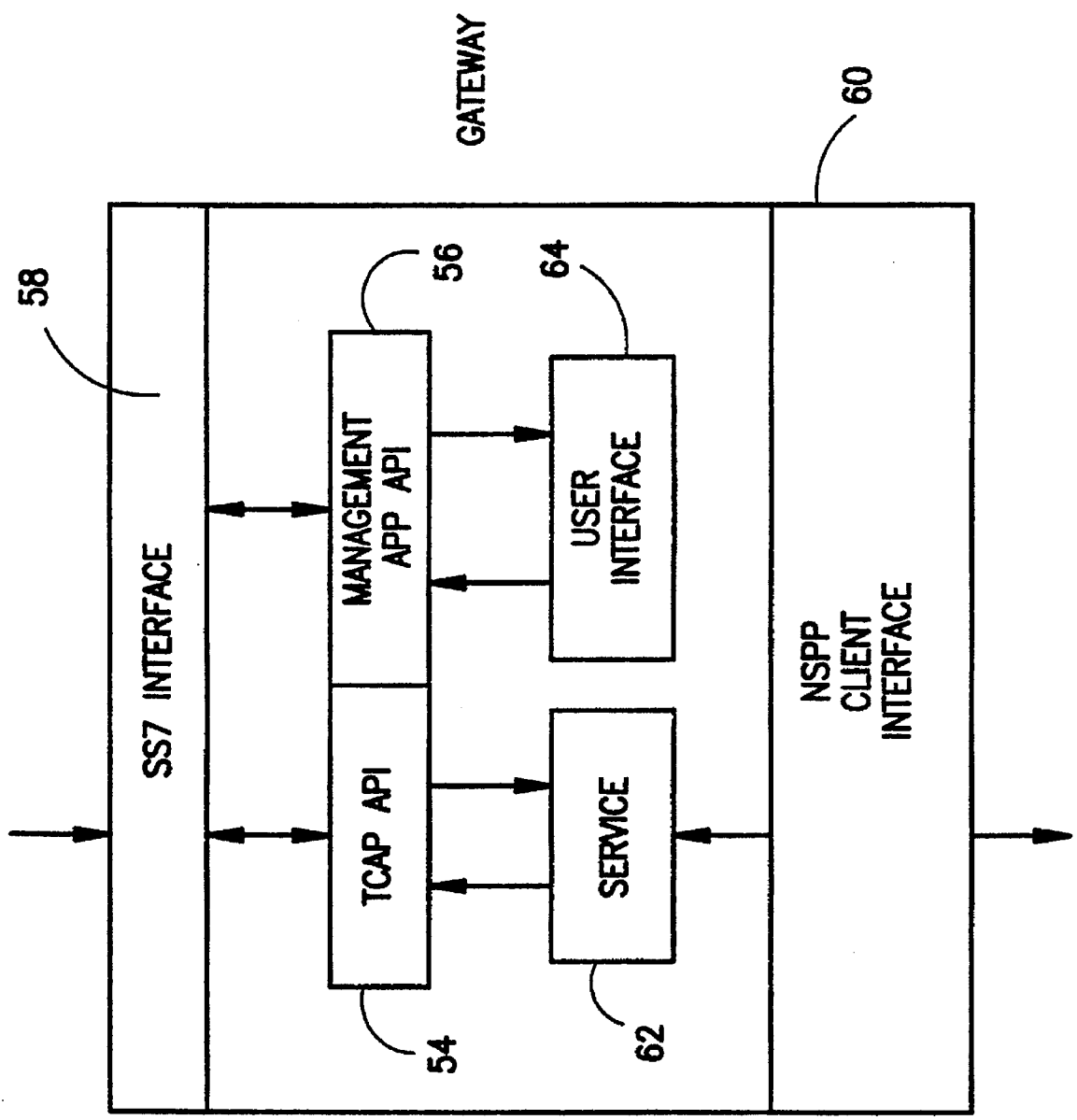
FIG. 4 is a block diagram of the major components of the gateway of the instant invention.

With reference to FIG. 4, a simplified block diagram of the essential portions of the translator/converter of the gateway is shown. In particular, using the SS7 protocol as an input, it can be seen that there is a TCAP API (application program interface) 54 adjacent to a management application API 56 both in communication with a SS7 input portion 58. The TCAP API enables the gateway to send and receive messages from SS7 input portion 58, specifically queries with SS7 protocol. Management APP API 56 enables the system to provide its own user interface to basically control the platform for linking up and down. In other words, the system can configure new links and timing parameters to fit with whatever system it is communicating. TCAP API 54 and management APP API 56 together therefore form an interface to the SS7 side of the gateway block shown in FIG. 4.

On the opposite end on the gateway block is the NIDS sequenced packet protocol (NSPP) client block designated 60, which is assumed to be the protocol of the other service provider. Interposed between TCAP API 54 and NSPP client 60 is a service block 62 that performs the different services for converting and translating the TCAP protocol to the NSPP protocol. A user interface 64 provides further control to the management APP API 56 for setting the required parameters for the translation and conversation of the gateway block shown in FIG. 4.

In brief, the gateway would receive the calling card validation query data, transmit this query data for response to a LIDB server, and receive and transmit the response data from the LIDB server to the ISN node. The gateway uses a common channel signaling system-type 7 (SS7) front end interface to receive and process the TCAP query data from public switching network 10 to the ISN node 14. A front end interface (FEP) enables the ISN node to process and transmit the LIDB query response data from the ISN node to the public switching network.

The gateway query process begins when SS7 interface 58 receives domestic or foreign card validation requests, and processes them into query messages. Then the gateway would send the queries to file servers 22 for comparison against its resident LIDB database. Each chosen file server processes the queries, determines whether to approve, deny or redirect them, then retransmits the responses to the gateway for processing and eventual transmission back out of the ISN node.

Figure 5:
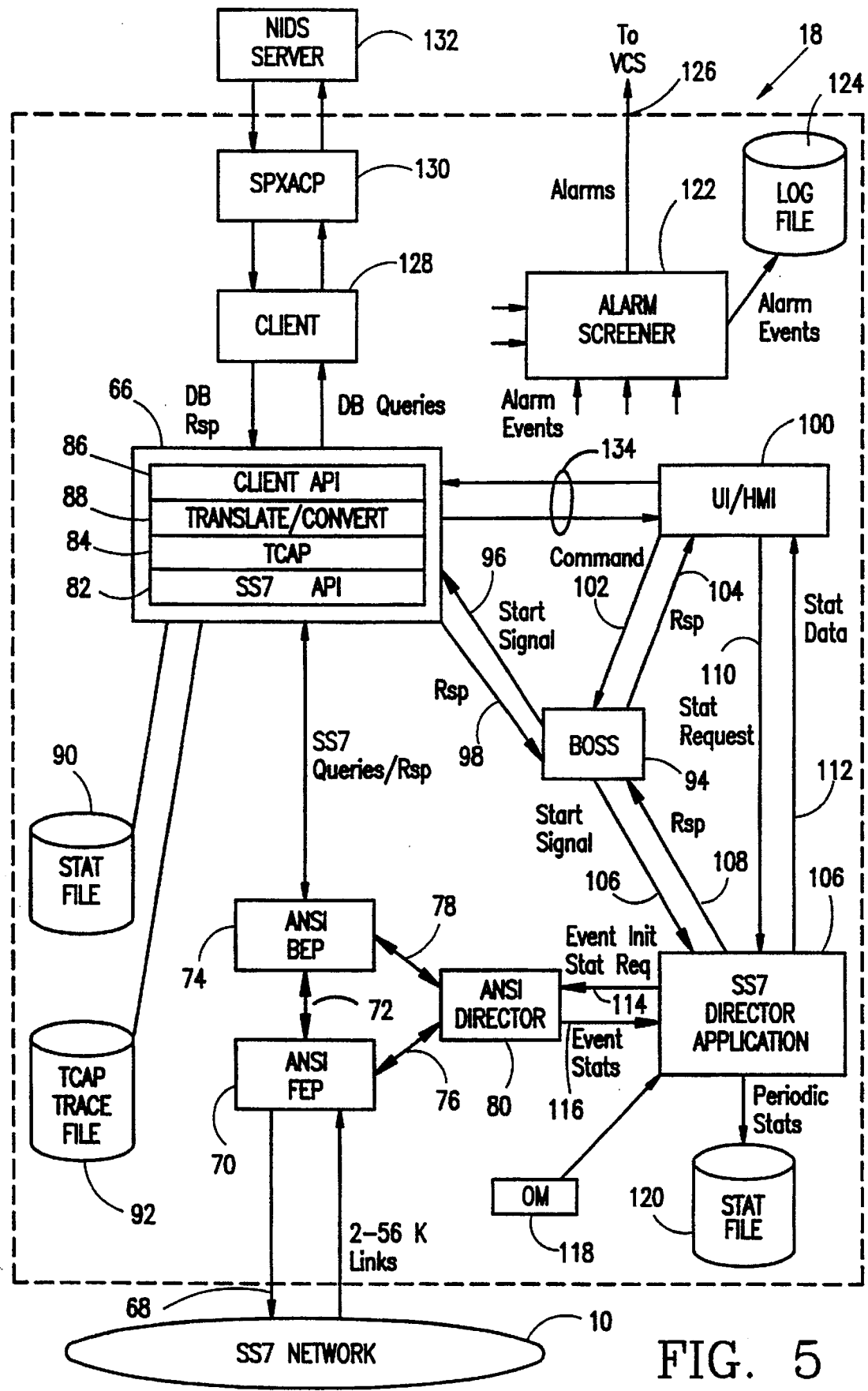
FIG. 5 is a more detailed diagram of the FIG. 4 gateway with additional components added thereto.

FIG. 5 illustrates the architecture of the gateway, such as 18, shown in FIG. 1. The various processes or modules discussed with reference to FIG. 4 are shown in block 66. As shown, a pair of linkset 68 provides a communication path between gateway 18 and PTN network 10, in this instance an SS7 network. Acting as an interface to network 10 is an American National Standards Institute front end processor (ANSI FEP) 70. For the embodiment shown in FIG. 5, it is assumed that ANSI FEP 70 is a SS7 front end processor. Connected to ANSI Flip 70 via line 72 is an ANSI back end processor (BEP) 74 which likewise is assumed to be an SS7 protocol handling processor. Connected to both FEP 70 and Blip 74 via lines 76 and 78, respectively, is an ANSI director 80. FEP 70, Blip 74 and director 80 together may be considered as a SS7 subsystem to provide a conduit between the queries incoming from network 10 and the responses from the translator and converter block 66.

In essence, Flip 70 receives incoming SS7 messages and sends out outgoing SS7 messages. In addition, it handles the multiple physical links, linkset 68, to the SS7 network 10. It moreover interfaces to BEP 74 and the translation/conversion subsystem 66. BEP 74, in the meantime, receives incoming messages from FEP 70 and uses these messages to update information in the global memory of the system. Blip 74 further makes information available for retrieval by subsystem 66. ANSI director 80 provides management interface to FEP 70 and BEP 74 and more particularly manages the interfacing between those components and network 10.

Connected to BEP 74 is the translator/converter system 66 which comprises, in essence, four subsystems: a SS7 API subsystem 82, a TCAP subsystem 84, a client API subsystem 86, and a translate/convert subsystem 88. For the FIG. 5 embodiment, system 66 is simply referred to as the translate/convert system. Connected to system 66 to provide and receive data are a STAT file database 90 and a TCAP trace file database 92.

Also shown connected to system 66 is a BOSS system 94. In essence, BOSS 94 controls the initiation of the gateway by reading a configuration file to determine which processes should be started. After the configuration file has been read, each of the processes is started and run throughout the partial initialization of the gateway. An application program interface (API) routine is called during the initialization of each of the processes started by BOSS 94, in order to set up communication therewith.

Once the system is started, BOSS 94 will be notified if one of the processes is terminated by a termination message. At that point, BOSS 94 could either restart the terminated process or restart the whole system. The action BOSS 94 takes depends on the configuration file.

BOSS 94 could also send heart beat messages, i.e. pulses, to the different processes set up to receive the heart beat messages in the configuration file. Thus, if a response to a heart beat is not received within a given time period, BOSS 94 could either restart the process that did not respond or restart the whole system. This is initiated, with respect to system 66, by line 96, which provides the start heart beat signals from BOSS 94 to system 66, and line 98, which provides the responses from system 66 to BOSS 94.

BOSS 94 further interacts with the user interface/human machine interface (UI/HMI) subsystem 100, per command line 102 and response line 104. BOSS 94 also interacts with an SS7 director application module 106 via start signal line 106 and response line 108.

UI/HMI subsystem 100, in addition to communicating with BOSS subsystem 94, also communicates with direct application subsystem 106 via lines 110 and 112. With reference to the interaction between BOSS subsystem and UI/HMI subsystem 100, it should be noted that a user can utilize UI/HMI subsystem 100 to start the system by means of a command sent to BOSS subsystem 94 via command line 102. A user can furthermore stop the system the same way. The status of the system can be gleaned by the user per the response provided to UI/HMI subsystem 100 by BOSS subsystem 94.

Director application subsystem 106, in addition to interacting with UI/HMI subsystem 100, also interacts with director subsystem 80. This is done by means of event initiation line 114 and event statistics line 116. In essence, director application subsystem 106 collects statistics and events, as well as OMs, from block 118, and stores the same in the statistics file database 120 on a periodic time basis. This stored data can then be retrieved by the operator, or user, by using the UI/HMI subsystem 100, per specific statistics request via line 110 to director application subsystem 106. The statistics data response is sent to UI/HMI 100 via line 112.

Also shown in the FIG. 5 architecture of the gateway is an alarm screener 122, which has connected thereto a log file database 124. Alarm screener 122 receives all alarm events sent by the different components of the gateway and stores those alarms in log file database 124. A list of the errors, or alarms, is sent as alarm messages to the VCS via line 126.

The BOSS subsystem 94, director application subsystem 106, UI/HMI subsystem 100 and alarm screener 122 together may be considered as the management subsystem of the gateway insofar as those subsystems together effect the control and management of the gateway.

The converted queries output from subsystem 66 are provided to a client module 128 which controls the flow of data from subsystem 66 to the interface to IPX network (SPXACP) 130. The client module 128 in essence provides queues for the messages that are to be sent to and returned from interface 130. The protocol converted queries are output from the gateway via interface 130 to the NIDS server 132, and presumably forwarded to the corresponding LIDB database for response. Such responses are fed from NIDS server 132 to the gateway via interface 130 and, via client module 128, to the translate/convert subsystem 166 to convert the protocol before the response messages are sent to network 10.

Figure 7:
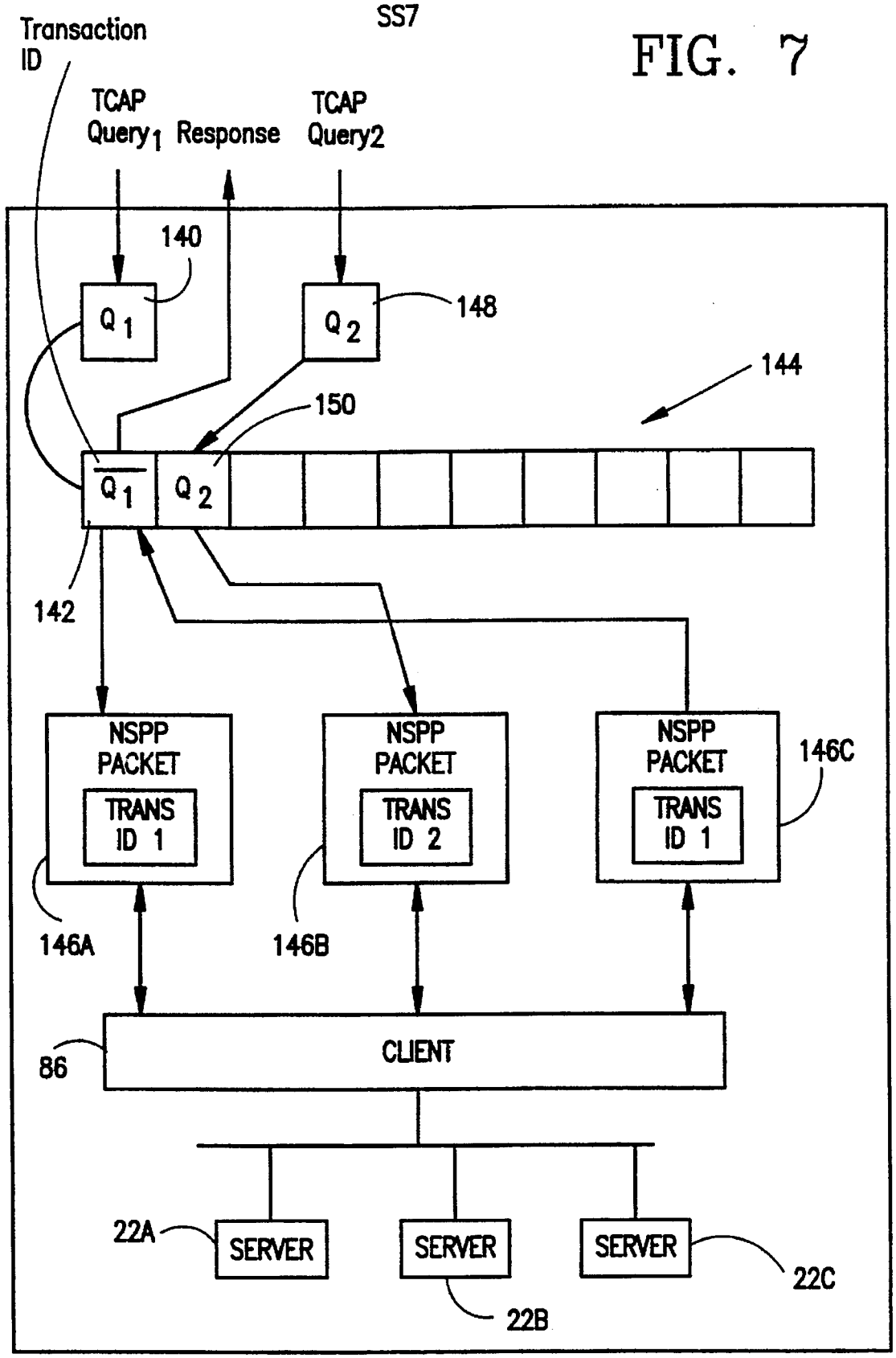
FIG. 7 is an illustration of the flow of a query and the response from a public telephony network to a service provider.

FIG. 7 shows the various processes of the translate/convert subsystem 66 and particularly illustrates the various interactions between the different processes. In particular, SS7 queries are input to the SS7 API module which provides the interfacing for converting the queries to TCAP queries. The TCAP queries are then routed to the TCAP module 84 and broken into a send sub-component, a receive sub-component and a statistics sub-component.

The receive sub-component decodes the entire TCAP message. Errors found in the TCAP message results in a "return error" or a "reject component" being returned to the sender. The send sub-component receives parameters from the translator/converter component 88. Included in the parameters are the dialog ID (from the original query), return status and any other parameters needed in building the return message.

The send sub-component has several pre-carmed TCAP response messages. And depending on the return status, the sub-component will pickup the appropriate response message, fill in the parameters from the input information, and output the message to SS7 API module 82.

The statistics sub-component keeps track of the TCAP statistics and log the statistics to a file on a periodic basis. This sub-component interfaces to the MI/HMI subsystem 100 via an interface, as for example via line 134. Live statistics are dumped to the UI/HMI subsystem 100. Some of the statistics include the number of TCAP queries received, the number of bad TCAP queries received, the number of TCAP responses sent, and the number of notice indications received, etc.

The TCAP component may also include a tracing facility where all of the TCAP messages are traced and dumped into the TCAP trace file database 92.

The translator/converter module 88 interfaces with the TCAP module 84, the HMI subsystem 100 and the alarm screener 122. In particular, the translator/converter 88 module has two paths, namely a send path and a receive path. It receives input requests from the TCAP module 84 and sends out response parameters to the same. The received input query parameters from TCAP modules 84 may include both inbound and outbound requests and responses. The three sub-components received from the TCAP module 84 are the send sub-component, the received sub-component and the statistics sub-component.

The received sub-components contains a list of parameters which are translated and put into a buffer, before being forwarded to the client process module 86. For this transmission, a pointer, a unique ID, service number, mode, key number, message type or server type name are provided. An ID identifying the SS7 query is placed into an array indexed by the unique ID. This unique ID is then passed to the NIDS and needs to be returned with the response from the NIDS (network information distributed service) to locate the SS7 dialog ID needed for issuing the correct response to the SS7 network. The client process module 84 also performs any database time out functions for the translator/converter (T/C) component.

The send sub-component receives responses from the client process module 86 through its queue 88. It decodes the response status and calls the TCAP module 84 with the appropriate return status and parameters along with the dialog ID.

The statistics sub-component keeps track of the T/C statistics and logs the statistics into a file periodically. The statistics sub-component also interfaces to the UI/HMI subsystem 100 via interface line 134 so that live statistics are provided to the UI/HMI subsystem 100. Some of the statistics include the number of T/C queries received, the number of T/C responses sent, and the number of NIDS timeouts, etc. As before, the T/C component may also be traced and all of the tracing messages can be dumped to a file, as for example the TCAP trace file 92. Any alarms from the translator/converter module are fed to alarm screener 122 via line 136.

The client process module interacts with the translator/converter module 88 via its queue 86. The client process module interfaces with the IPX process module 138 (referred to as the SPXACP system 130 in FIG. 5) by sending the NIDS requests and receiving the NIDS responses. The client process module is furthermore responsible for communicating with file servers 22, via its handling of the timeouts and transport parameters.

FIG. 7 shows in greater detail the translating and converting of a message with a first protocol to a message with a second protocol, specifically for example from an SS7 protocol message to a NSPP protocol message. As shown, a TCAP query, designated 140, is input to an array, for example the first block 142 of array 144. The query in block 142 of array 144 is then converted as an NSPP packet 146A containing its transaction ID. NSPP packet 146A is next forwarded to the client module 86, which in turn forwards the query, now with the proper protocol, to the appropriate file server 22, to be compared with the account numbers in its LIDB database.

Since there are three servers 22 shown in FIG. 7 and the array 144 has a plurality of blocks each adaptable to receive a separate TCAP query, a second query 148 may be provided to block 150 of array 144 at the same time that server 24A is in the process of validating query 140. The second query 148, from block 150 of array 144, can at the same time be routed as another NSPP query 146B to client module 86. In fact, additional queries may be routed to client module 86 in a round robin fashion insofar as there are a plurality of file servers 22, renumbered 22A–22C in FIG. 7. As additional queries come in, the now validated first query 140 is returned from server 22A to client module 86. This validated response is returned, as NSPP packet 146C, to array 144. And with the proper conversion, the response is output to the SS7 network as a response with the proper protocol containing the proper transaction ID.

The interrelation between the various components and functions of the instant invention, and particularly that relating to the gateway, are shown in FIGS. 8–15.

Figure 8:
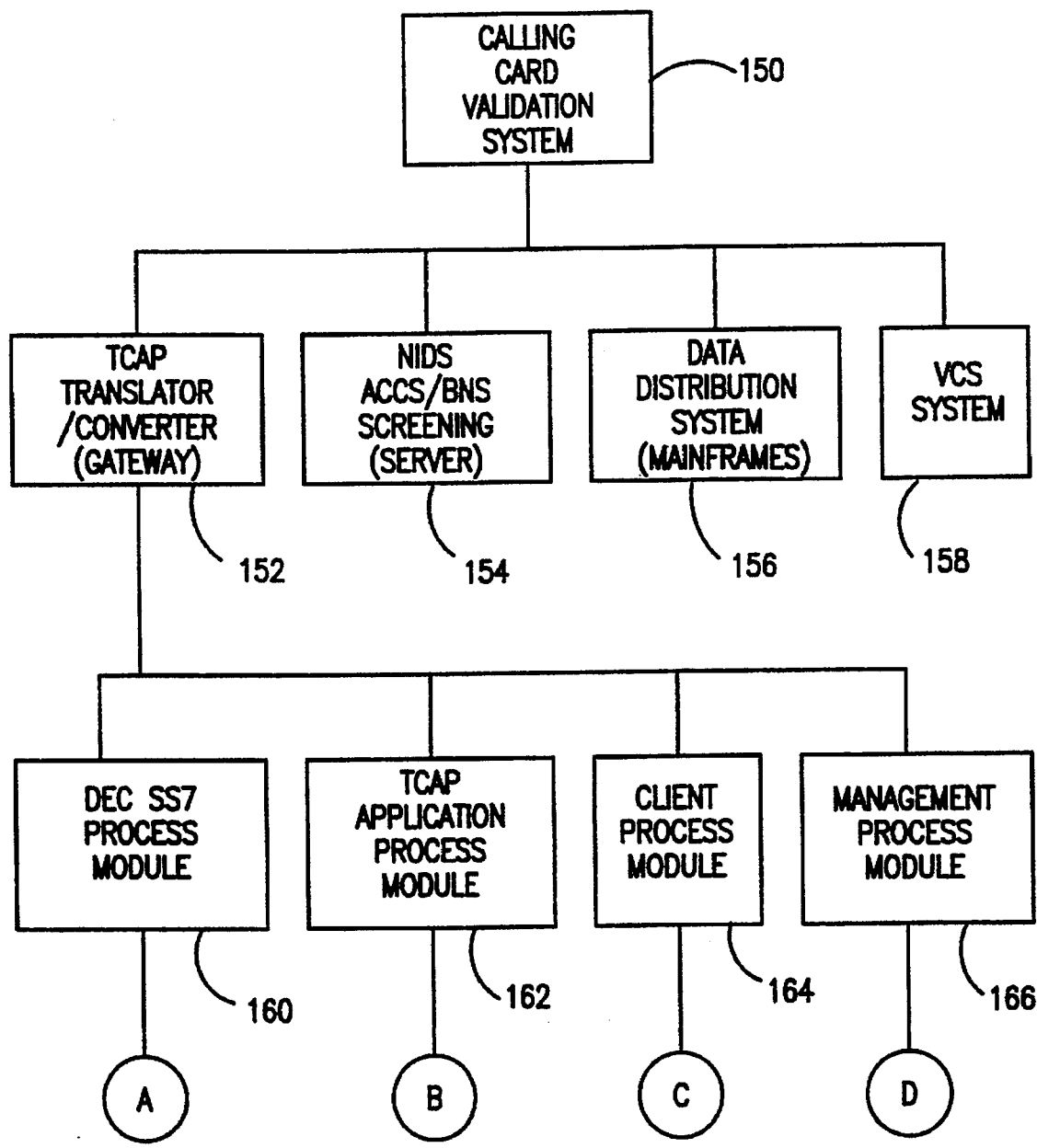
FIG. 8 is a block diagram overall view of the different components of the system of the instant invention, focusing specifically to the gateway.

With reference to FIG. 8, the calling card validation system of the instant invention, designated 150, as discussed above, is shown to have four major components—namely gateway 152, server 154, mainframe 156 and VCS 158. As discussed above, gateway 152 may be considered, among other things, as the component that does the translation and conversion of messages (or queries) having a first protocol to a second protocol. Server 154 has, among one of its major functions, the function of ACCS/BNS screening of the messages, i.e. the validation of the calls placed by a customer or subscriber. Mainframe 156 in essence controls the management and distribution of copies of the corrected databases to the various file servers so as to ensure that all databases are synchronized and have the correct information. VCS 158, on the other hand, provides the monitoring that needs to be done to ensure the smooth functioning of the complete system.

As further shown in FIG. 8, gateway 152 is further sub-divided into a number of modules. These modules, with reference to FIGS. 4 and 5, may be referred to as a SS7 module 160, a TCAP module 162, a client module 164, a management module 166, and an OM collector module 168. Albeit the respective modules in FIG. 8 are numbered differently than the modules numbered in FIGS. 4 and 5, it should be noted that most of those modules are the same and it is only for the convenience of the reader that the modules in FIG. 8 under the gateway module 152 are numbered differently.

Figures 9, 10:
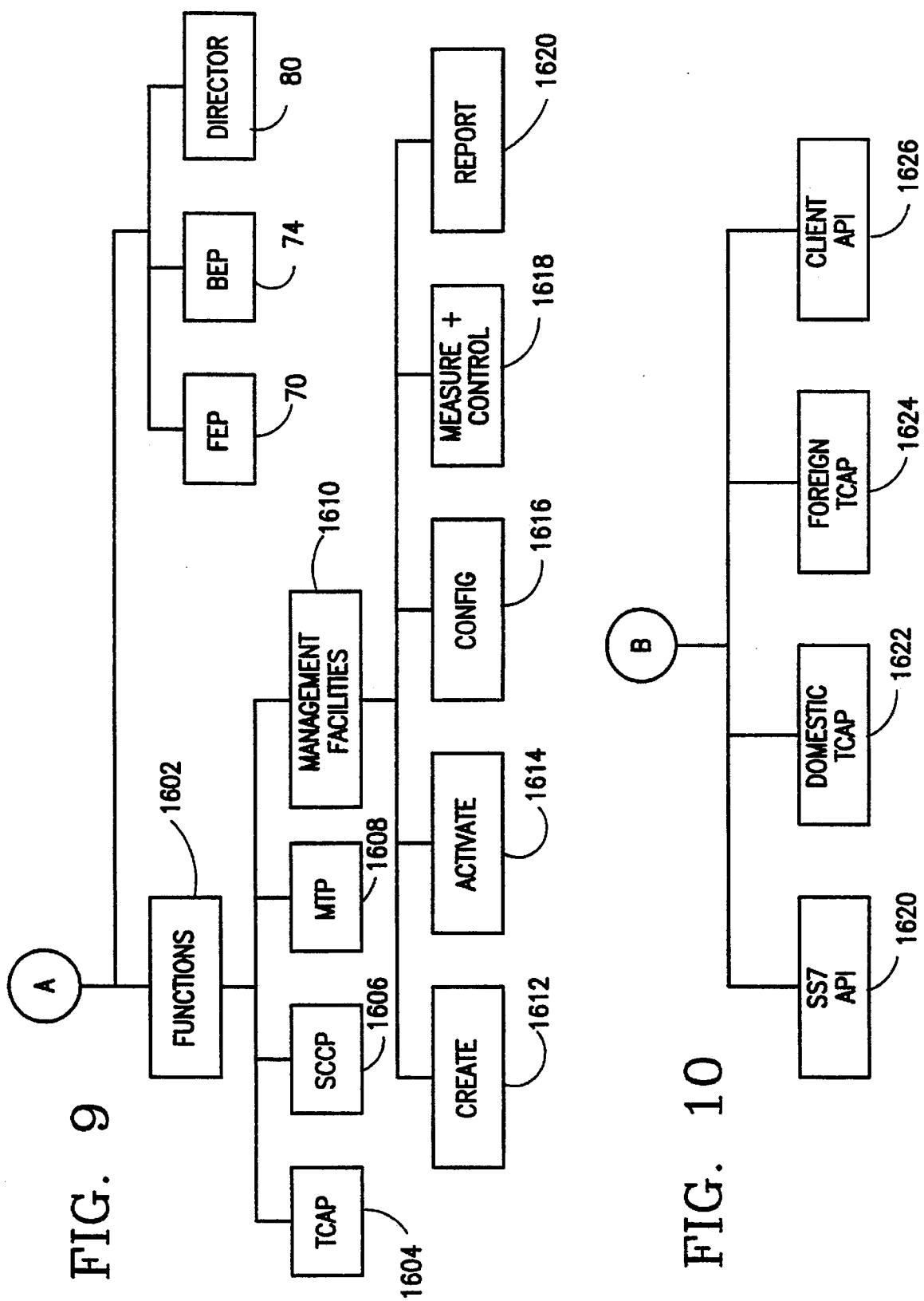
FIG. 9 is a block diagram illustrating the different functions and modules of one of the sub-modules, or routines, of the translator/converter residing in the gateway of FIG. 5.
FIG. 10 is a block diagram illustrating the different components of the TCAP application module of the translator/converter of the present invention gateway.

The different functions performed by SS7 module 160 are shown in FIG. 9. As shown, SS7 module 160 has a plurality of functions, designated 1602, which in turn are sub-divided into the transaction capabilities application part (TCAP) function 1604, the signaling connection control part (SCCP) function 1606, and the message transfer part (MTP) function 1608. In addition, SS7 module 160 has the function of managing the facilities, as indicated by block 1610. Some of these management facilities functions include a create function 1612, an activate function 1614, a configuration function 1616, a measure and control function 1618, and a report function 1620.

TCAP application module 162 of FIG. 8 has a number of sub-components, more clearly illustrated in FIG. 10. As was mentioned before, the TCAP application module processes the TCAP queries received from the SS7 FEP 70 (FIG. 5). It then interfaces with the client process module for sending and receiving messages from the NIDS LIDB database server. As shown in FIG. 10, the TCAP application module has the following four sub-modules: a SS7 API sub-module 1620, a domestic TCAP application sub-module 1622, a foreign TCAP application sub-module 1624, and a client API (application program interface) module 1626. Do note that SS7 API module 1620 and client API module 1626 are both used by the domestics TCAP module 1622 and foreign TCAP module 1624.

SS7 API module 1620 includes all of the SS7 API interface routines for the TCAP applications. These routines will hide all the specific initialization and dialog controls associated with API SS7 interface routines from the TCAP application. Note that SS7 API is actually a part of each of the TCAP applications that uses the API. Domestic TCAP sub-module 1622 contains all the indication routines called by SS7 API sub-module 1620 and the client API sub-module 1626. In addition, the domestic TCAP sub-module 1622 performs limited validations and assembles a TCAP response. Upon receiving a TCAP query, the domestic TCAP sub-module 1622 will validate a number of parameters before parsing the TCAP message. When a condition is not met, a reject message is returned. The parameters from the incoming TCAP query include, along other parameters, the called and calling addresses and the involved ID.

The foreign TCAP sub-module 1624 sends the query to the NIDS foreign card service provider for processing. When the query is returned from the NIDS foreign card service provider (after validation had taken place at its LIDB server), the foreign TCAP sub-module 1624 would call for a SS7 API hand over that would send the query to the correct LIDB for final processing.

Figure 11:
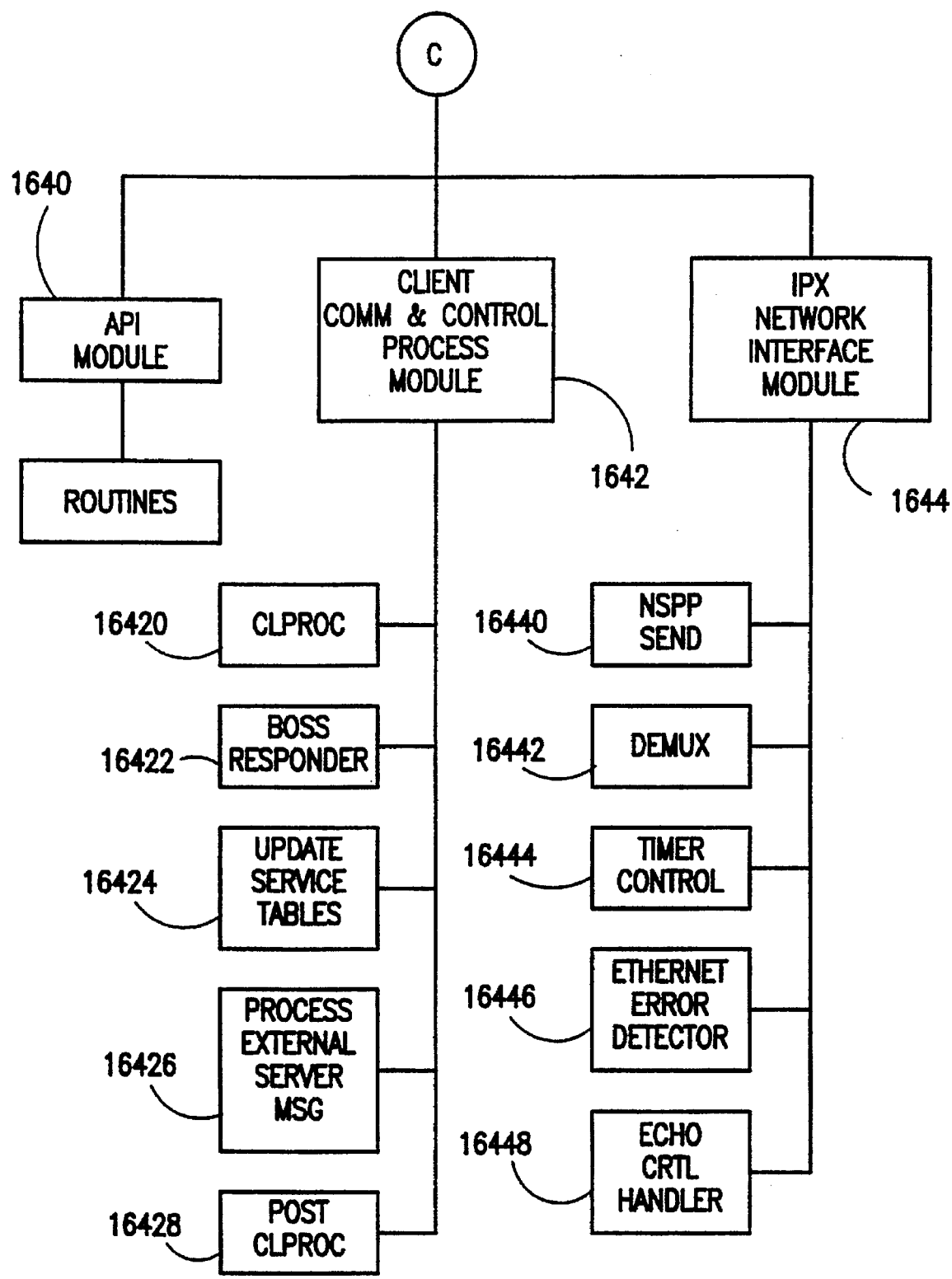
FIG. 11 is a block diagram illustrating the different functions and modules residing at and being performed by the client module of the present invention gateway.

As shown in FIG. 11, the client module 164 (FIG. 8) comprises three separate components—an application program interface (API) module 1640, a client communication and control process (client) module 1642, and an interface to the IPX network interface (SPXACP) module 1644. These three components are autonomous with the exception that API module 1640 is linked with an application (domestic, foreign, and OM) at first.

As shown in FIG. 5, data may come into the client API sub-module 1626 from many sources, such as from the TCAP applications, the OM application, the NIDS LIDB and management processes (BOSS and UI/HMI). Client module 1642 would respond to all of these incoming processes as well as send information to alarm screener 122.

The OM and TCAP applications gain access to client module 1642 by initiating an attach request. Client module 1542 responds to the attach request by returning an attach response to the application. When the application has completed its processing, a detach request is sent to the client module. There is no detach response from client module 1642.

Once attached, the various applications can send data to the client module. This data may be in the form of database queries (from TCAP applications) or informational messages (from the OM application). Data is transmitted from one of the active file servers that can handle the specific type of data. Responses of the servers are received by client module 1642 and routed to the originating application. During periods of low traffic, such as for example 4 messages per second, client module 1642 will generate artificial traffic so that the integrity of the network and servers can be monitored. The file servers, in response to the traffic, will generate appropriate messages that signal that the network and the servers are operational.

The management process (BOSS subsystem 94 in FIG. 5) also sends heartbeat request and shut-down messages to client module 164. In turn, client module 164 responds to the heartbeat message with a heartbeat response. In the event that client module detects a server network problem, an action message is sent to BOSS subsystem 94. When the problem is corrected, client module 164 sends another message to BOSS subsystem 94 requesting it reactivate the system.

Return to FIG. 11. Note that API module 1640 allows the various applications access to client module 164 via a simple set of sub-routines. These sub-routines allow the application to attach to the client module, send data to the databases, receive responses and detach from the client module. Do further note that API module 1640 is actually part of the applications, or processes, that use API. In other words, client API 1626 shown in FIG. 10, for example, is not a stand alone process. Rather, it incorporates the API modules 1640 shown in FIG. 11. However, since the API module in essence is a library routine which is used by more than one process, it is described as a stand alone module 1640 in FIG. 11.

API module 1640 comprises a number of routines that allow the application access to the various features of the client module. The first routine may be identified as an initial routine which opens all required mailboxes, attachments to share memory, and attach requests to the clients etc. In other words, the initial sub-routine initializes all aspects of the interface between the application and the client including creating mailboxes for receiving responses and messages from/to the client module.

Further with reference to FIG. 11, a second sub-module of client module 164 is a client communication and control process sub-module 1642. Module 1642 may be considered as the hub for processing all messages and queries sent to client module 164. At this sub-module, queries are processed up to the point where the data is ready to be hand back to the network. In other words, the IPX network interface will take the data, add protocol control information to it and send the message to the IPX network. Sub-module 1642 also processes received network packets after protocol information has been removed.

To do of this processing, the client communication and control process module 1642 requires a number of sub-modules or subprocesses. A first of these subprocesses resides in the client process (CLPROC) sub-module 16420. CLPROC could be considered the main process for client module 164. It receives all application requests for services from a server; and performs all of the functions required to guarantee message delivery to the server; or if no server is available, to indicate the error condition. In addition, CLPROC will perform a simple diagnostic function on the IPX network to determine if it is available.

CLPROC is started by the BOSS system 94 before any process performed by client module 164, by establishing its mailboxes and global memory areas and wait for processes to attach. Once an application attaches, CLPROC can send queries (TCAP application) or OM messages (OM process). CLPROC will then format the messages into a NSPP packet for delivery to the IPX network, and transmit each message to one of the available file servers that can process the type of request specified. Those servers that do not respond to the request are removed from the list of available servers. Messages that are not responded to after a specific predetermined amount of time are "rolled" to another server automatically. Messages received from the IPX network are compared to all outstanding messages. If a new message is in the list of outstanding messages, the new message is formatted and sent to the appropriate application. The outstanding message is then removed from the queue of outstanding messages. If a received message does not match one of those messages in the queue, it is ignored.

In addition to processing messages, CLPROC must be able to determine if the IPX network is operational. During high traffic times, the messages themselves can be used to determine if the network is operational. However, when traffic dips below a certain level, as for example 3 to 4 messages per second, artificial traffic is generated. An IPX inactivity of over 1 second interval is an indication that the IPX network is inaccessible. CLPROC would then inform BOSS subsystem 94 of the network problem so that BOSS 94 can take the appropriate action.

Client communication and control process module 1642 further has a BOSS responder module 16422. BOSS responder module is responsible for sending messages to the BOSS process system 94. There are three basic message types that BOSS responder module handles. One of the messages is the heartbeat response message in reaction to a heartbeat request message sent by BOSS system 94, as for example via line 95 in FIG. 5. The other two messages are initiated by CLPROC 16420 and inform the BOSS system 94 of certain error conditions. A first one is a so-called BOSS action message which comprises three sub-messages. To elaborate, if the ethernet rail, such as for example 20 in FIG. 1, is totally unavailable, BOSS system 94 is requested to stop the front end processor 70 to thereby stop the applications. On the other hand, if all file servers are unavailable (but the ethernet rail is still functional) BOSS 94 is requested to stop the applications but not the FEPs. Finally, if after a stop condition one or more of the servers comes back on line, BOSS 94 is then asked to restart those processes it had previously stopped.

A third sub-module of the client communication and control subprocess module 1642 is an update service tables module 16424. The update service tables module monitors the various messages received from the file servers and updates the data structures relating to those servers. In addition, it also attempts to establish a session and take a service with all available servers. Thus, module 16424 will keep the availability condition current for each of the file servers. If a server fails to respond to requests from the module, that server is removed from the list of available servers, and the module would send a message to inform the system of the status change of the server. When that server comes back on line, it will generate a special message identified as a pulse periodically until module 16424 sees that pulse. At which time a request is sent by the module to the server, and if an acknowledge message is received, the module will next try to pick the database service on that server. If a pick response message is received, that server is declared up and available. A message is then sent to inform the system of the state change of the server.

Figure 6:
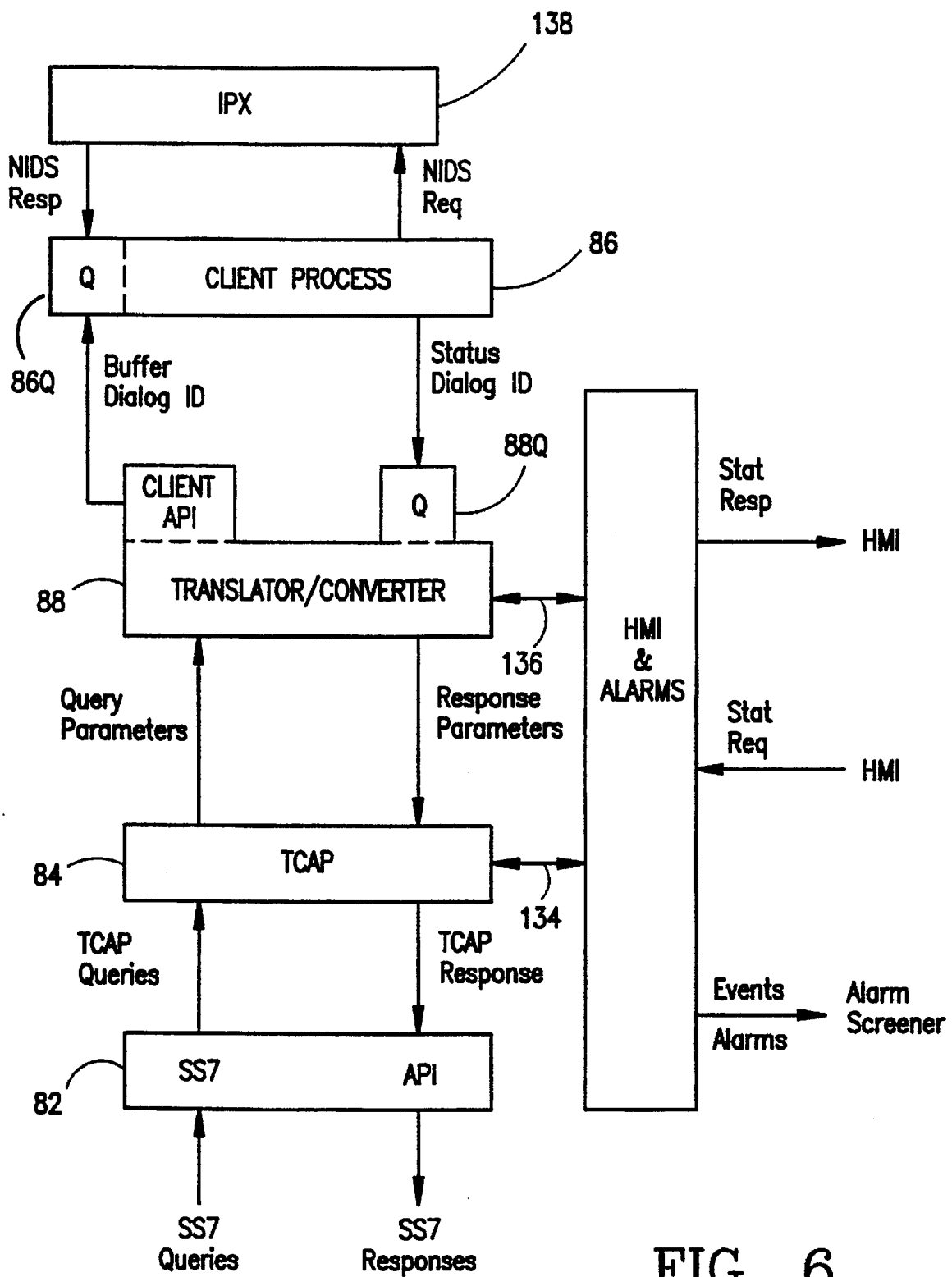
FIG. 6 is a block diagram illustrating the process performed by the gateway of FIG. 5.

A fourth sub-module of the client communication and control process module 1642 is a process external server MSG module 16426. Module 16426 receives all NIDS messages from the IPX network interface. It then determines the type of message received and directs the message to the appropriate processing module. There are three basic types of NIDS messages which the process external service MSG module receives—an open session response, a pick service response and a query response. All of these messages are responses to queries. The first two responses are sent to update server tables module 16424 while the last is sent to a post CLPROC module 16428 (to be discussed later). All of the received messages are verified by matching a response with an item in a pending queue, such as queue 86 in FIG. 6. If a message is received that does not have a corresponding identification in the pending queue, that message is discarded, since it is assumed that it was a retransmission of a previously received message.

Post CLPROC module 16428 is yet another module that operates under the client communication and control process module 1642. The post CLPROC module receives messages that are to be transmitted to an application mailbox. This routine determines which application is to receive the message and directs the message to that application. To achieve this, post CLPROC module 16428 uses the message ID to find the message in the queue of requests. The attach/detach response message, although never queued, nevertheless contains all of the information needed for message routing. Messages that are not found in the queue are discarded, since they either contain erroneous data bits or have already timed out. The original request, along with the response message received, are used to create the final API response message, which is written to the application mailbox. Counts are maintained whenever a message is read from the mailboxes. A calculation is performed by the post CLPROC module to determine the number of messages still in the mailbox and if the mailbox will overflow shortly.

Client process module 164 also has IPX network interface module 1644 to perform three functions. First, IPX network interface module 1644 formats message data to contain IPX and NSPP protocol information, and transmits the resulting packet onto the ethernet network. Second, the IPX network interface module, and more specifically the sub-modules thereof, receive responses, determine the destination of the responses, strip off the protocol information, and send the responses to those destinations. Finally, the IPX network interface module monitors the ethernet network traffic, and if necessary, generates artificial traffic, in order to determine whether the ethernet is available for traffic data. The IPX network interface module has a number of subroutines, or modules, for carrying out its functions. These sub-modules are discussed hereinbelow.

The first sub-module of the IPX network interface module is the NSPP send sub-module 16440. NSPP send sub-module 16440 prepares a packet for transmission on the IPX network. It inserts the protocol information and ensures that the packet is proper for IPX transmission. The NSPP send sub-module would receive a message to transmit. The message would also include information on the type of service required. Upon receipt of this message, the NSPP send module would look for the next available file server to transmit the message to. If there are no available servers, an error message is sent back to the application via post CLPROC sub-module 16428. When a server is selected, a package is created by the NSPP send sub-module that contains the IPX and NSPP protocol information and the message data that is to be transmitted. An event control block (ECB) is then filled in with the server address and pointer to the message to send. The completed ECB is sent to SPXACP block 130 (FIG. 5) for transmission onto the IPX network.

The next sub-module of the IPX network interface module is a demux sub-module 16442. The demux sub-module receives all IPX messages transmitted to the gateway. Each message is then determined for the kind of message it is and distributed to the proper module for final processing. The packet received from the SPXACP process module 130 would contain a pointer to the received data as well as the address of the originating gateway. The demux sub-module furthermore examines the ECB and the data packet to determine the packet type. Pulse packets broadcast by the server are sent to update service tables sub-modules 16424. Echo control packets are sent to an echo handler sub-module 16448 (to be discussed later). All other message packets are sent to the process external server MSG sub-module 16426. All messages from a server will cause an echo timer to be reset. It is only when the message traffic decreases to the point where the timer expires will a timer control sub-module 16444 cause the echo messages to be transmitted.

The timer control sub-module 16444 is another subroutine of the IPX network interface module 1644. As was mentioned in the previous paragraph, the timer control sub-module monitors the elapsed time between message reception events. If a "no message received" timer expires, the timer control sub-module will initiate the sending of artificial massages to the file servers and the other gateways. If data is still not received, the timer control sub-module will take steps to stop the front end processor of the gateway.

IPX network interface module 1644 also has an ethernet error detection sub-module 16446. The ethernet error sub-module is called by the timer control sub-module 16444 to report an ethernet error condition or the removal of an ethernet error condition. This sub-module reports the error condition the first time it is detected but will not report the condition until the condition goes away or comes back.

Figure 12:
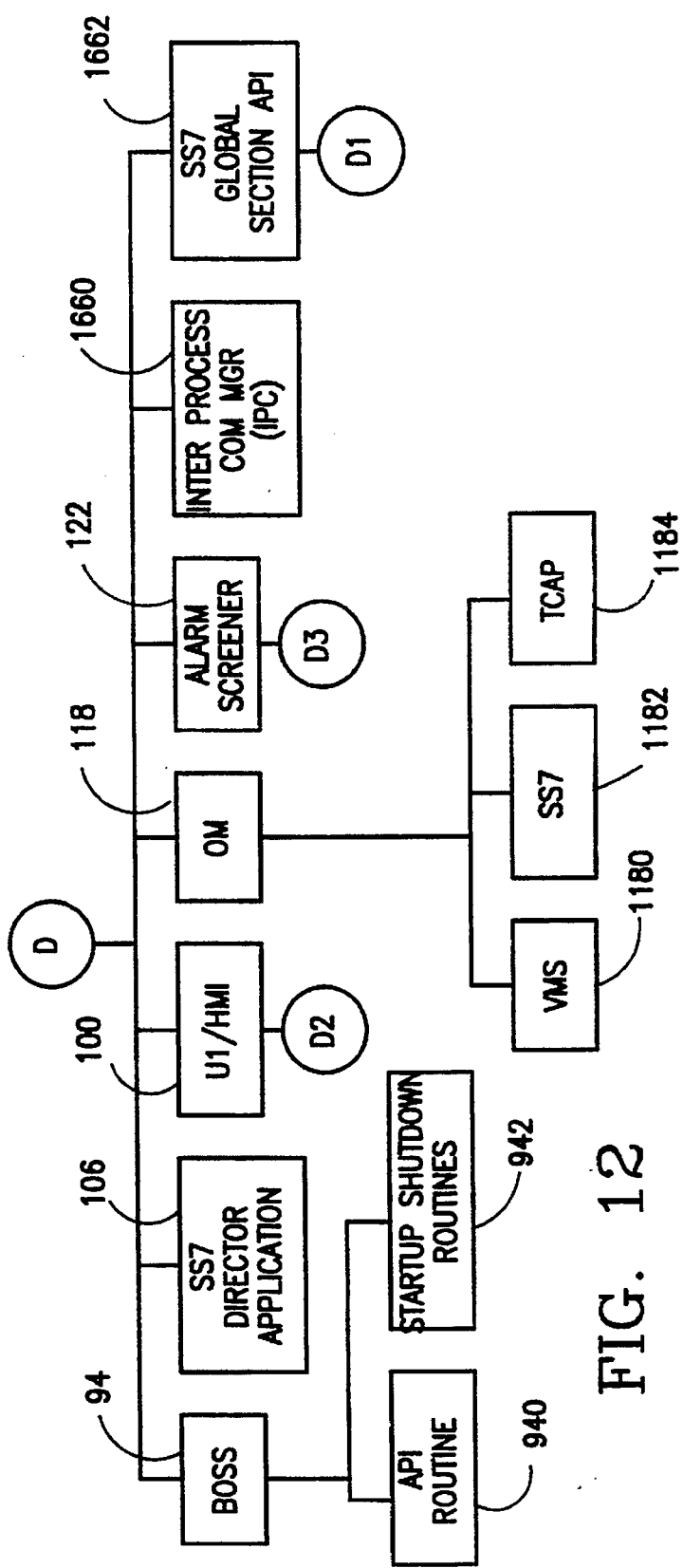
FIG. 12 is a diagram illustrating the different functions and modules being performed by the management module of the translator/converter component of the FIG. 5 gateway.

The last major process performed by translate/convert system 66 of gateway 18 is the management process module 166 shown in FIG. 8. As shown in FIG. 12, the management process module 166 comprises a number of processes and subsystems. Specifically, the management process module 166 comprises the BOSS process of BOSS system 94 for start up and shut down, SS7 director application 106, user interface/human machine interface (UI/HMI) 100, operational measurements application (OM) 118, alarms screener 122, inter-process communications manager (IPC) 1660, and a SS7 global API process 1662. The BOSS process, SS7 director process, UI/HMI process, OM process, and alarm screener process were discussed with reference to FIG. 5, although more discussion with respect to those processes will be had later.

IPC 1660 handles the inter-process communications between all the gateway processes within a node and across the nodes. The IPC process is started by the BOSS process before the other processes are started. The BOSS process receives a termination mailbox message when the IPX process exits. The BOSS process then restarts the IPC process. The IPC process in turn monitors the health of the BOSS process. The BOSS process enqueues a VMS lock on start up and the IPC process, on start up, enqueues on the same lock. Therefore, when the BOSS process exits, this lock gets dequeued and the IPC gets the lock. The IPC process then restarts the BOSS process.

The IPC process accesses the other IPC processes running on all of the nodes. When a message needs to be transported across the node, the local IPC process sends the message to the remote IPC process running on the other node so that the remote IPC process could relay the message to the appropriate process or a set of processes on the remote node.

Each of the SS7 gateway processes communicates with a number of other processes to exchange information. Some processes need to communicate with their counterparts running on remote nodes in order to synchronize the gateway. For example, if the client process 164 running on one node needs to send a server failure message to all of the UI/HMI processes running throughout the gateway, then the IPC process would have to relay the message to all of the UI/HMI processes. The IPC process also provides access to local TCAP/IP counters for requesting processes on remote nodes. In order to accomplish such tasks, a global section is created by the IPC process. This global section contains a list of processes which have "attached" to the IPC process for each of the nodes.

On cold start up, the IPC process creates the global section and initializes it. It gets a list of gateways. Thereafter, the IPC process establishes task to task communication with each of the configured nodes. After successful establishment of communication with another IPC, the IPC process keeps each other informed of "attached" processes. When a process attaches to the IPC process, the IPC process would update the global section and send a broadcast message instructing the remote IPC processes to update their global sections. Similarly, when a process detaches (exits), the IPC process would broadcast the change to all of the remote IPCs. Therefore, the IPC process gets notified on a change of status for all attached processes running on all of the nodes and it updates the appropriate tables in the global section.

The primary function of the IPC process is therefore to transport messages from one process to another. These messages have two components, namely a header and message detail. Whenever a message is sent by a process to another process, an IPC send API routine would add the header block to the message for the IPC to decode. The header block in turn consists of a "function code" which specifies the operation to be undertaken, the sending process name and the process ID. Depending upon the message type (destination point, reply node number, etc.), additional header information may be submitted to the IPC process. Some of the functions performed by the IPC process are: attach the IPC request, transport message request, broadcast message request, message received, IPC process status request, and TCAP counter request.

Figure 13:
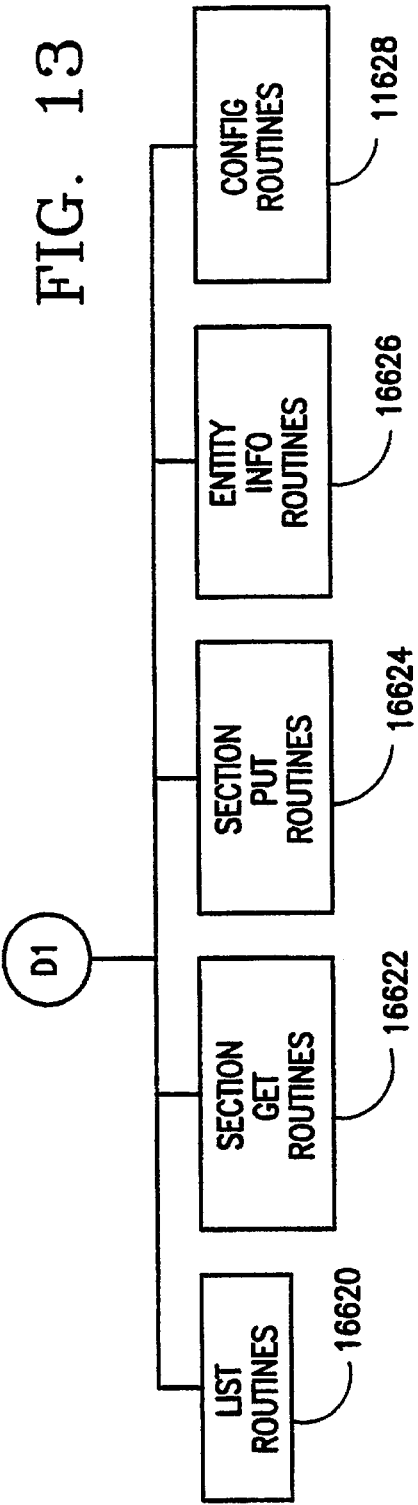
FIG. 13 is a diagram illustrating the functions being performed by one of the components of FIG. 12.

The SS7 global section API process 1662 comprises a set of library routines. The SS7 global section is created, mapped onto and accessed for reading and writing by these routines. All of the processes requiring access to the SS7 global section are linked to the routines during compiled time and the section is accessed through these routines only. As shown in FIG. 13, these API routines can be categorized as follows: list routines 16620 for listing the various entities configured in the system (for example a list of the linksets configured); get routines 16622 for accessing the status, counters, events and characteristics of all of the entities configured in the system for reading; put routines 16624 used to access the status, counters, event and characteristics of all of the entities configured in the system for writing; the entity information routines 16626 such as status and counter description, their sizes, etc.; and configure routines 16628 for creating, editing and deleting any entry in the global section and the SS7 configuration files.

With further reference to FIG. 12, the BOSS process of the BOSS system 94 operates as follows. When the BOSS starts, it reads a configuration file indicating which processes should be started by the BOSS process along with other information about the processes. Once the configuration has been read, the BOSS module creates all of the processes. Once all of the processes have been created, the BOSS process goes back through the list of processes and sends a message to each process telling it to complete its initialization and then to a running state. The processes are started according to the order they are specified in the configuration file. When the processes are started, the BOSS process indicates a mailbox that will send to the VMS module a message when the process dies. That way the BOSS process is made aware at anytime when a process terminates. Once the processes have started, the BOSS process sends heartbeats to the processes that have heartbeat flag set to yes. If a response is not heard from a process within a given time out period, the BOSS process will restart that process or all of the processes in the system.

A configuration file is read by BOSS each time the system is started. The configuration file defines the processes that BOSS should start, the order that the processes should be started, and other information about each of the processes. As shown in FIG. 12, API routine 940 is used to communicate with the BOSS process by sending a start response message along with the mailbox ID and the process name of the node that is responding. Then the routine would wait for the BOSS instruction message from the BOSS process which indicates the initial run state and the debug state. This routine also opens up the mailboxes used by the process to communicate with the BOSS process. The ID passed to the routine is the mailbox ID of the mailbox used by the BOSS process to send the messages to the process.

There are also start up and shut down routines 942 associated with the BOSS process. To start up, a flag is sent to each of the processes during the start up of each process to indicate if it is a warm or cold start up. A cold start is when the BOSS process starts for the first time or because a user has requested that the system be stopped, so as to be started from the UI/HMI system 100. The gateway process is started, for the embodiment of FIG. 5, in the following order: SPXACP process; IPC process; SS7 processes including initializing FEP; SS7 director process; FEP initializing process; director application process; client process; domestic TCAP application (this application process is started only if the process name is found in the SS7 configuration file); foreign TCAP process (this application process is started only if the process name is found in the SS7 configuration file); OM process; and send message to director application process to bring up links.

The shut down sequence routine performs the following process to gracefully shut down the gateway: send message to director application process to exhibit links; wait for response from director application process; shut down the OM process; the domestic TCAP application process; the foreign TCAP application process; the client process; the director application process; the SS7 processes; the SS7 director application process; the FEP; the IPC process; and the SPXACP process.

The SS7 director application process 106 services requests from the human machine interface (HMI) and the operational measurements (OM), the BOSS and the TCAP application processes to monitor and control the gateway and the SS7 network. In addition, the SS7 director application process is notified whenever there is any SS7 events or alarms. When there is, the process would dispatch those messages to the alarm screener process 122 for further processing of the alarms. In addition, on receiving alarms/ events which result in change of status of the linksets, links, destination and applications, the SS7 director application process would broadcast them to the HMI system for display. In sum, the director application process 106 provides the following services to the requesting processes: (1) the SS7 parameters (i.e. updates the status, counters, characteristics and events for various SS7 entities); (2) the SS7 configuration (creation and deletion of SS7 entities, modification, addition and removal of SS7 entity characteristics); and (3) SS7 maintenance (enabling and disabling of SS7 entities, activating, deactivating links, etc.).

In addition, on cold starts (communicated to by the BOSS process), the SS7 director application process configures the gateway and the network from its own perspective, that is, it brings up all of the SS7 entities in its own node. The process also services requests from the BOSS process and the TCAP application process for configuring a part of the network. Since the SS7 configuration and the parameters are required to be accessed by the SS7 director application process as well as the other requesting processes, these data are stored in a global section, i.e. the SS7 global section.

The SS7 director application process receives requests from different processes and it serves them and sends the response for the requests to the requesting processes. When any of the SS7 processes starts up, it attaches with the IPC process, i.e. creates VMS mailboxes to send and receive messages to and from the IPC process. To send a message, the sending process sends the message to the IPC process through the mailbox and the IPC process. On receiving the message, the sending process relays it to the process to which the message is to be sent. The messages may be received synchronously, as an asynchronous system trap (AST) is invoked on receiving a message. When a message is received, an AST is invoked which queues up the request message on a self relative interlocked queue and sends an indication event flag for the main process. The main process then waits on the event flag and, upon receiving a message, dequeues the message from the queue, processes the message and sends the response to the requesting process.

The request to SS7 director application process 106 can be broadly classified into two types, namely monitoring and control. The monitoring requests are requests to get data for status, counters, characteristics, and events for an entity. The processes which request them are the HMI and the OM. In addition, the director application process, on start up or any configuration change, enables events for the entities to be configured. This means that the SS7 director application process would notify the director system 80 whenever there are alarms or events in the gateway or network. The control requests, on the other hand, are used for configuring and maintaining the network. These requests comprise create, delete, modify, add, remove, enable, disable, etc., and are made by the BOSS process and the HMI process. Upon receiving any of these requests, the SS7 director application process relays the request to the SS7 director application module 106.

The SS7 director sends the response to the request at the AST level. The AST routine, in turn, queues up the responses and sets the event flag for the main process to dequeue each message and send the response to the HMI process. The SS7 director module would then send the response message in a format of an output list. The output list contains information such as the status of the request (success or failure), the time stamp, the status, counters, events and characteristics depending upon the type of request. If a success response is received, the SS7 director application process would write the data to an appropriate table in the SS7 global section. Thereafter, it sends the response to the requesting process (be it the HMI, OM or BOSS). In the case of a control request which involves either create, add, modify, remove or delete, the director application process, on receiving the response from the SS7 director, in addition to updating tables in the SS7 global section, would broadcast the request to the other director application processes running on the other nodes so that they can also update their respective global sections. In the case of an ethernet failure, if the message cannot be delivered to any of the nodes, the director application process will undo the previous command and send an undo message to nodes where the message can be successfully sent, so that those processes at those nodes can undo the previous request. Thereafter, the director application process sends a configuration failed network message to the BOSS system or to the HMI system.

In short, the director application process allows configuration and maintenance actions to be taken only when all of the configured nodes are running. The request and the response messages contain, in addition to source and destination addresses, a function code which specifies the action to be taken and the optional data to qualify the action.

The operational measurements (OM) process 118 collects operational data from various gateway processes and system data. The data counts indicate the system and specific software process performance. The OMs are classified into three groups, namely VMS OMs 1180, SS7 OMs 1182 and TCAP (including client) OMs 1184.

The VMS OMs are updated periodically, for example every half hour. The SS7 and TCAP OMs are likewise tagged at periodic times, as for example every 15 minutes. The OMs gathered are input to the mainframe via the file server. Some OMs are stored onto the local disk of the gateway. Two configuration files are provided in order to gather OMs for the mainframe and the local disk.

The OM process subtracts the current 15 minute counts from the last 15 minute counts before forwarding to the mainframe. If the last 15 minute count is greater than the current 15 minute count, for an individual counter, the substraction is not done. This is to avoid negative counts. Counters are reset on stop/start gateway, process stop/start, etc.

The configuration file granularity is based on entity, i.e. all of the counters for that particular entity are reported. In order to assure the performance of the system, such that the incoming queries are not effected, there is an upper limit on the number of entities that are configureable. The following entities may be in the configuration file of the OM process: client, domestic, foreign, FEP, BEP, MTP, SCCP, TCAP, BEP, LINK, DEST, data link, route, MSG timing.

During the initialization stage, the OM process establishes communication with the BOSS via a VMS mailbox. It then maps to the global sections of IPC and client. A VMS mailbox channel is established with the client and IPC processes to send counter values to the mainframe and VCS, respectively. The client process forwards the counter value to the mainframe, via the IPX protocol. The node name is obtained, since it is to be used in API calls together with SS7 counters. Three event flags are used for three timers—1 minute, 15 minutes, and 30 minutes. The OMC (OM collector process) sends requests for OMs to be gathered via IPC. The OM process sends a response if there is no OM data for a particular entity. If the particular entity is configured, OMs are forwarded to the OMC by the OM process.

As was noted above in FIG. 5, UI/HMI process 100 (to be referred to hereinafter simply as HMI process) is a SS7 gateway maintenance tool and monitoring module. It sends requests to and receives gateway status from the BOSS system and the director application system via the interprocess communication transport (IPC) module 1660.

Figure 14:
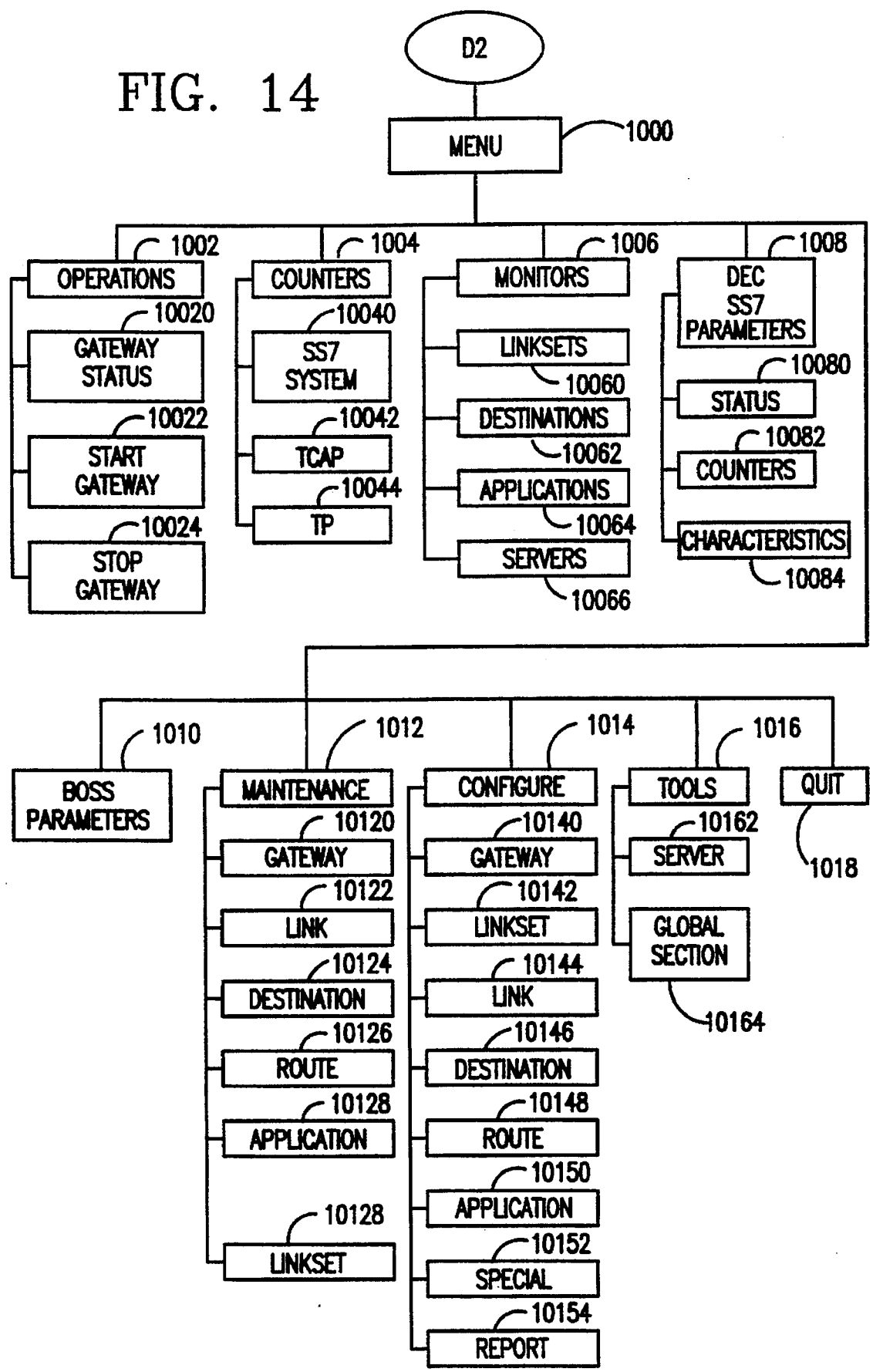
FIG. 14 is a block diagram illustrating the different sub-functions being performed by the human machine interface (HMI) component of FIG. 12.
Figure 25:
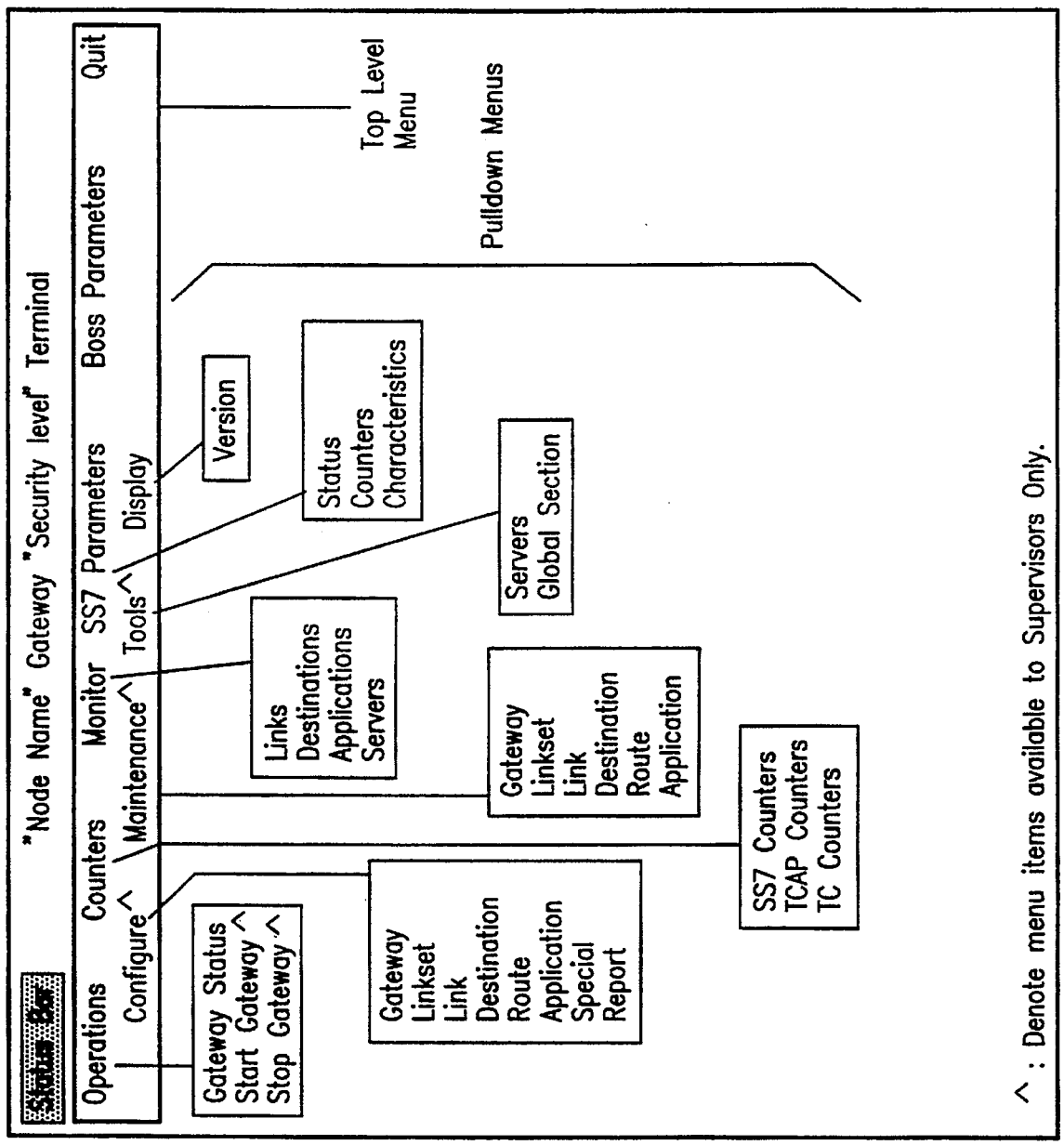
FIG. 25 is an exemplar screen illustrating the various menus under which an operator can interact with the various components of the present invention system.

With reference to FIGS. 14 and 25, do note that the HMI process is a manual driven module with a static structure that responds to dynamic changes in the node configuration and events. The events are processed through monitor functions within an asynchronous trap (AST) generated by the reception of a qualifying system status event. The changing node configuration requires menus that change. The dynamic menus reflect the existing configuration at the instance of their creation.

When the director application process 106 (FIG. 12) receives a qualifying event, it updates the global section to reflect the status change and sends a command to the IPC to generate a broadcast to all HMI processes. The HMI process then receives the broadcast as an AST. The broadcast message includes the name of the item and the new status. This information is used to update the monitor display for that category. The information is also used to update the status bar. The severity of the item's category is compared to the system data. If the category status has changed, the status bar is updated.

On start up, the HMI main menu 1000 is displayed. From this menu, the user can perform all required tasks. The HMI process has two levels of user security, the monitor level to monitor the status of the node and the supervisor level to perform monitoring and maintenance actions. The HMI process provides continuous monitoring of the gateway regardless of the current task, through the use of a status bar above the top level menu. This status bar informs the user the current status in the areas of linksets, links, destinations, applications, and the servers. The detailed status of any of these areas are viewed in the monitor menu, selectable from the top level menu.

The maintenance actions that the HMI process provides include: (a) configuring entities within the node (gateways, linksets, links, destinations, routes, application); (2) configuring the timers; and (3) changing the status of an entity (activate, deactivate, enable, disable, etc.). Do note that the selection made from the top level menu by a user will perform an action or presents the user with another menu. The flow of the HMI process is best described by the flow of the top level menu to the sub-menus or functions that result from the selections by the user, as illustrated in FIG. 14.

As shown, the HMI process has multiple menu levels. The top level menu contains the following sections: operations 1002, counters 1004, monitors 1006, SS7 parameters 1008, BOSS parameters 1010, maintenance 1012, conFIG. 1014, tools 1016, and quit 1018. When user selects a menu item, the selection will result in: (1) the sending of a command to another process in the node, and wait for a result; (2) the displaying of another static menu for the user to select the next item; and (3) the creating and displaying of a dynamic menu for the user to select an item.

The commands for selecting the menu items are sent through the IPC process which delivers them on the specified gateway. After each command is sent, the HMI process waits for a response on the status of that command.

The dynamic menus are created using information from the global section about the current status and configuration of the network and the gateways in the node. For example, if the user must choose from existing gateways, the HMI process would request the list of gateways, then constructs the menu from the list. The new menu is valid at the time of creation. If the user believes that the items in the list are no longer valid, the menu can be regenerated by exiting to the top level menu and reselecting the correct menu items.

From operations top menu 1002, the user can select a gateway status menu 10020, a start gateway status menu 10022 or a stop gateway menu 10024. The selection of gateway status menu 10020 provides the user, or operator, with the basic status of all existing gateways. Here is where the user can tell whether the gateway is running or stopped. When gateway status is selected, a request for gateway status is sent to the BOSS process on all concerned gateways. If the status request is successful, the result is displayed. If the request fails, a message is sent to the user to indicate that the gateway status request failed. The HMI process returns to the top level menu after either result.

The start gateway status provides a user, having a supervisor status, a dynamic menu that contains the names of all of the gateways. The user can select to start a gateway. If confirmed, a start gateway command is sent to the appropriate BOSS process via the IPC process to start the processes in the start list. The list is defined within a BOSS configuration file and contains the following processes: the BEP, director and FEP processes, the director application process, the client process, and the TCAP applications process, at a minimum. When the start up is completed, the gateway status is shown. The gateway is now ready for configuration and activation. The stop gateway menu 10024 can only be accessed by a supervisor operator. When so selected, the menu creates a dynamic menu which the user can make a selection to send a command to the BOSS process on the particular gateway to sequentially stop the gateway process in a proper order, to thereby remove the specified gateway from service. Under the menu counters 1004 at the top level menu are menu selections SS7 system counters 10040, TCAP counters 10042, and TP counters 10044. These counter values shown through the HMI process are best defined as a "snap shot" of the counter. The display of the value is static and will not change until a new request is made.

The user could select a category of counters to view, upon selecting a menu list of all existing gateways. The user then selects the gateway from which to get the counters. The HMI process requests the specified counters from the director system through the IPC process. This request tells the director system 80 to update the counts for that counter type. When the update has been completed, the director system responds back to the HMI process to inform it that the counter data in the global section has been updated. The HMI process then retrieves the counter data from the global section, as a snap shot which is then displayed.

Under the monitors menu 1006, a user can select the following menus: links sets 10060, destinations 10062, applications 10064, and servers 10066. Each of those menus is a dynamic display.

The linksets menu, when selected, results in a scrolling display window containing the linkset name and status, followed by the link socket logic connection or signaling link code (SLC). The linkset status is reflective from a nodal view, while the link status is from an individual gateway view.

The destinations menu 10062, when chosen, results in a scrolling display window containing the destination name, type (if other than SSP (service switching point)), and status. This menu also shows the route names and status. When selected, the applications menu 10064 results in the creation of a display window containing the application name at the signaling call connection part (SCCP) level and status. This menu also provides the TCAP BEP status of the gateway.

When the servers menu 10066 is selected, a display window shows the name of the file server, and its status, which is provided by the client process.

The SS7 parameters menu 1008 provides the following choices: status, counters, or characteristics.

Upon selection, status menu 10080 provides the user the ability to select the entity status to view. The HMI process requests the status of the specified entry from the director system, through the IPC process. This request tells the director system to update that status for the entity. When the update has been completed, the director system responds to the HMI process to inform it that the entity status information in the SS7 global section is up to date. The HMI process then retrieves the status for the entity from the global area and displays the values of the status on a scrolling display window. The display window includes the gateway name, the name of the entity, and a description of each status in that entity followed by the status.

The counters menu, upon selection, provides a dynamic menu of all configured SS7 entities, which the user can elect to view. The HMI process requests the counters of the specified entity from the director system through the IPC process. The request triggers the director system to update the counters for that entity. When the update has been completed, the director system responds back to the HMI process to inform it that the entity counter information in the global section is up to date. The HMI process then retrieves the counters for that entity from the global area and displays the counter values on a scrolling display window. This display window includes a gateway name, the name of the entity, and a description of each counter in that entity followed by the values.

The characteristics menu provides the user a view of the characteristics of the entity. Like before, the HMI process requests the characteristics of the specified entity from the director system through the IPC process. This request triggers the director system to update the characteristics of that entity. Again, when the update has been completed, the director system responds back to the HMI process by informing it that the entity characteristic information in the global section is up to date. The HMI process then retrieves the characteristics for the entity from the global area and displays the characteristics on a scrolling display window. The display includes the name of the gateway, the name of the entity, and a description of each characteristic in that entity followed by the value.

The BOSS parameters menu 1010, when selected by a user having security clearance, allows the user to change the BOSS parameters on all existing gateways. The HMI process displays a window for editing the BOSS process parameter which may include the heartbeat frequency (i.e. the seconds between heartbeat pulses), the start timer, the stop timer, the retry interval, the retry limit, and the response time out in seconds. At the end of editing, if the user has the security level required, he can save the edited parameter or exit without saving them. If new parameters are saved, the new parameters are sent to all IPC processes on the other gateways. Each IPC process will save the new parameters to the BOSS configuration file, and then respond to those parameters. The HMI process maintains a copy of the old parameters and the new parameters so that if an IPC process does not respond, a message containing the old parameters is sent to the IPC process. This is to ensure that the data on each gateway is uniformly maintained, even if a gateway loses communications with the other gateways, or is too busy. If the new parameters cannot be saved on all gateways due to a failure to respond, a message is displayed to the user that the changes will not be implemented due to implementation failure.

Maintenance menu 1012 provides the following menu selections: gateway 10120, link 10122, destination 10124, route 10126, application 10128, and linkset 10128. The actions performed by each of the applications are performed across the node.

When selected, the gateway menu creates a dynamic menu list of existing gateways which in turn allows the user to select a gateway to perform gateway maintenance. The current status of the gateway is shown on a display window. The user selects from a menu the choice of removing a gateway from service or to put a gateway into service. This selection is of course dependent on the gateway's current status. But it is the user who must decide on the appropriate action. Trying to remove an already removed gateway will have no visible effect and no error message is displayed. If the command fails due to loss in communications, a failure message is displayed.

The link selection results in the creation of a dynamic menu of existing links. The user can select a link from the show links to perform maintenance on. The current status of the chosen link is shown on a display. The possible maintenance commands are: activate, deactivate, enable, disable, exhibit, uninhibit and link test. The activate command activates a link which was in an inactive state. The deactivate command deactivates an active link by changing the link state from available to inactive. The enable command enables a link from the disable state to the inactive state. The disable command disables a link and changes the link status from inactive to disabled. The inhibit command inhibits the link to put it out of service. The uninhibit command uninhibits an inhibited link. A link test causes the HMI process to send a link test command to the director system, which then sends the request to the director system and responds back to the HMI process with the test result. The HMI process displays the result as a message to the user.

The destination menu provides a list of all existing destinations by name. The user can select any one of the destinations from this menu to perform maintenance on. The possible maintenance commands are enable and disable. When enable is chosen, a destination is selected. If the links and linksets are available and a route to a destination is enabled, the destination set is changed to accessible. In the case that all possible links sets are unavailable, the destination status remains as inaccessible. The disable command disables the destination if the route to the destination is already disabled.

The selection of the route menu 10126 shows the user a list of all existing routes by name. The user can select a route from this menu to perform maintenance on. The possible maintenance commands are enable and disable. An enable command enables a route. If the links and linksets are available, the destination status is changed to accessible. In the case that all of the possible links sets are all unavailable, the destination and route status remains as inaccessible. The disable command disables the routes to the destination.

When selected, the application menu 10128 shows the user the existing applications by name, subsystem number (SSN) and the name of the gateway. The user can select from the menu the choice of either removing from service or to put into service commands. The put into service command results in the application status being changed to allow the sending of an in service state request to bring it into service. The remove from service command changes the status of an application from allowed to prohibited.

The linkset menu 10128 provides a display of the existing linksets and their current status to the user. The possible maintenance commands and linkset statuses are: make available, make unavailable, and make disabled. Depending on the current status of the linkset, it may be necessary to pass the linkset through an intermediate status before the final desired status is reached.

The make available command is operable only if a linkset or links are in an unavailable status. The make available command initiates the HMI process to send an activate linkset command to the director system via the IPC process. The director system then passes the command onto the SS7 director system which provides a response back to the director system. If the links associated with the linkset are in an active status when a linkset is made available, the links also become available. The make unavailable command can only be used when the current status of the linkset is available. The make disable command disables the linkset. However, that linkset must first be in an unavailable status.

The configure menu 1014 provides the following menu selections: gateway 10140, linkset 10142, link 10144, destination 10146, route 10148, application 10150, special 10152, and report 10154.

Under the gateway selection, the user can select the following commands: add gateway, remove gateway, and gateway parameters. The add gateway command creates an editing display for the gateway name and the originating point code (OPC). The HMI process verifies that only one OPC is assigned to the node, with a display infoming the user of the OPC for the node. This information is then used to instruct API commands to send to the director system to create the gateway and enter it to the global section once the gateway has been created. To change the OPC, the gateways on the nodes must be removed, the node restarred, and the new OPC used to add gateways.

The remove gateway command enables a user to remove a gateway. Upon making this selection, the statuses associated with different entities are checked to ensure that the linksets and data links are disabled. If everything checks out, a command to remove to the gateway is sent to the director system which removes the gateway from the SS7 global section.

The gateway parameters menu provides the user an editing menu that displays the present values of the timer for all existing OPCs. A copy of the values of the old timer is maintained by the HMI process to ensure that the data on each gateway is maintained, even if a gateway loses communications with the other, or is too busy.

The linkset menu provides the user the option of adding or removing linksets by the add linkset and remove linkset commands, respectively.

The link menu provides a user the following commands: add link, remove link and data link parameters. The add link and remove link commands are self explanatory. The data link parameters command provides an editing menu which displays the present values of the data link timers. The user can enter a new value for each of the timers. The HMI process sends commands to change the timer values on each data link when the change of the data link parameters is confirmed. To do this, the HMI process maintains a copy of the old timer values so that if an IPC process does not response, a message containing the old timer values would be sent to the IPC processes. This ensures that the data on each gateway is maintained even if the gateway loses communications with the other gateways, or is too busy.

The destination menu provides the following commands for the user: add destination or remove destination. The adding and removing of the destination is effected by the director system which can either send, add or delete command to the director system to add/delete the destination from the global section.

The route menu under the configure top menu provides a user the add route or remove route commands, each of which instructs the director system to enter information into the global section depending on whether or not the destination route is to be created or deleted.

The application sub-menu 10150 provides a user the commands of add an application and remove an application. Each of these commands instructs the director system to either enter information into or remove information from the global section.

The special menu 10152 provides a number of choices for the user. The first choice is add CPC which allows the user to select an application to which a concerned point code is added. The user then selects the destination by name for which the application with the new CPC has been added. The remove CPC is another command which enables the user to remove a concerned point code from an application, and then select the destination by name to remove from the CPC for the application that was selected. The add alias node menu item allows the user to find an alias node. The remove alias node item allows the user to remove the definition of an alias node. An add ISN node menu item allows the user to define an ISN node. If the ISN node has not yet been defined, the user can select from a dynamically created list of all destinations. The remove ISN node menu enables the user to remove the definition of an ISN node.

The last menu item under the configure menu is report 10154. The report menu item allows the user to create a complete configuration report for the node.

Under the menu item tools 1016, the user can select the following menu items: server 10162 and global section 10164.

The server menu item provides the user the choice of put server on line or take server off line. To put server on line choice enables the user to place a server on line. In contrast, the take server off line choice, if selected, places a server off line.

The global section sub-menu 10164 provides the user the option of selecting a global selection back up so that the global section contents of a specified gateway is backed up.

The last top menu quit 1018 shown in FIG. 14 is, as its name implies, allows the user to quit the HMI process.

Figure 15:
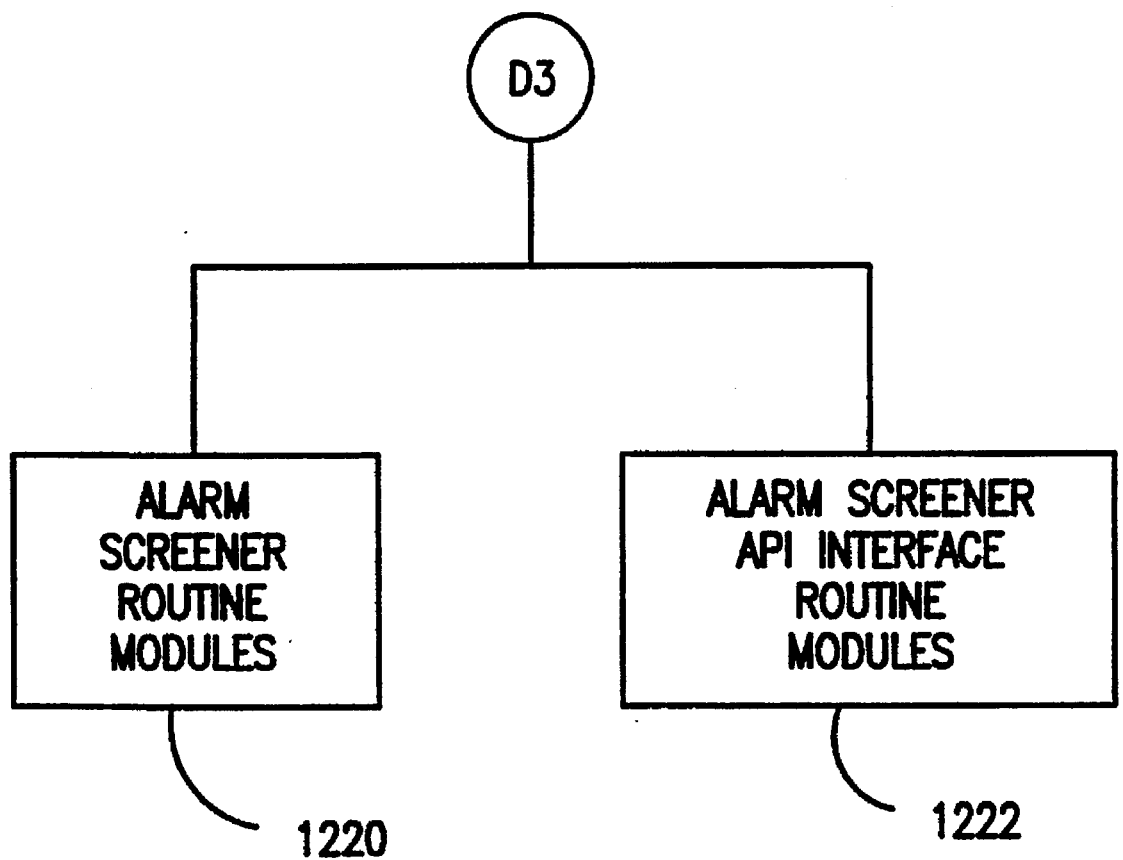
FIG. 15 is an illustration of the sub-modules of the alarm screener module of FIG. 12.

FIG. 15 illustrates that alarm screener 122 (FIG. 12) comprises an alarm screener routine sub-modules 1220 and alarms screener API interface routine sub-modules 1222. As was stated before, the alarm screener process accepts events from other processes via a FMS mailbox. All events are logged to the alarms log. When the log file reaches the size specified in the configuration file (i.e. the number of bytes), the log file is renamed and a new file is opened.

The alarm screener module 122 uses information provided in the configuration file to determine which events are alarms. If an event is classified as an alarm, the alarm screener module will write the alarm to the console ports of the VCS system 30 (see FIG. 1). There are four different parameters listed on the first line of the configuration file. They are: the site ID; the directory where the log files are to be written; the maximum size that the log file is to grow; the flushing interval for the log files (seconds); and the event numbers to send to the VCS as alarms. The remaining data on the file is the alarm numbers to be entered into the alarm table.

There are a number of alarm screener routines 1220. These include: an open log file routine; a close log file routine; a clean up routine which performs all necessary clean up before quitting the alarm screener module; a read configuration file routine; an alarm handler routine that sets the flush flag every time an alarm occurs; a flush routine that closes and then reopens the log file; a back log file routine, a process alarm routine that writes the event message to the alarm log file and then looks up the event number in the event table and, if the event is flagged as an alarm, sends the message to the VCS; and a send to the OPCOM routine in which alarms are sent to the operator communications manager (OPCOM) if the alarm screener is not available.

Under the alarm screener API interface routine sub-module 1222, there are four API routines that are used in conjunction with the alarm screener process 122. Do note that the API is actually a part of each of the applications that uses the API. Thus, the alarm screener API routines are not a stand alone process. However, since the API is a library that is used by more than one process, it is described by itself.

The first alarm screener API sub-routine is the void general alarm routine that is called to send event messages to the alarm screener. The first time this routine is called, it establishes communication with the alarm screener process. In subsequent calls to this routine, the message is just sent to the alarm screener. Each event message is formatted. If the process cannot send the message to the alarm screener, then the formatted event message is sent directly to the VCS.

A second API routine is the initiate alarm routine in which the node name and process name of the sending process are retrieved and saved. This routine opens up the alarm screener config file and reads the site ID and saves it in a static format. Afterwards it opens the mailbox to the alarm screener process.

Another routine under the alarm screener API interface routine module 1222 is a send to OPCOM routine which writes the message directly to the OPCOM if an alarm is not able to be sent to the mailbox of the alarm screener. This happens when the mailbox is full or some other failure has occurred.

Yet another routine under the alarm screener API interface routing modules 1222 is a debug routine which is used to log messages only if a certain debug level has been set. The debug level is set when the BOSS process starts a process.

Figure 16:
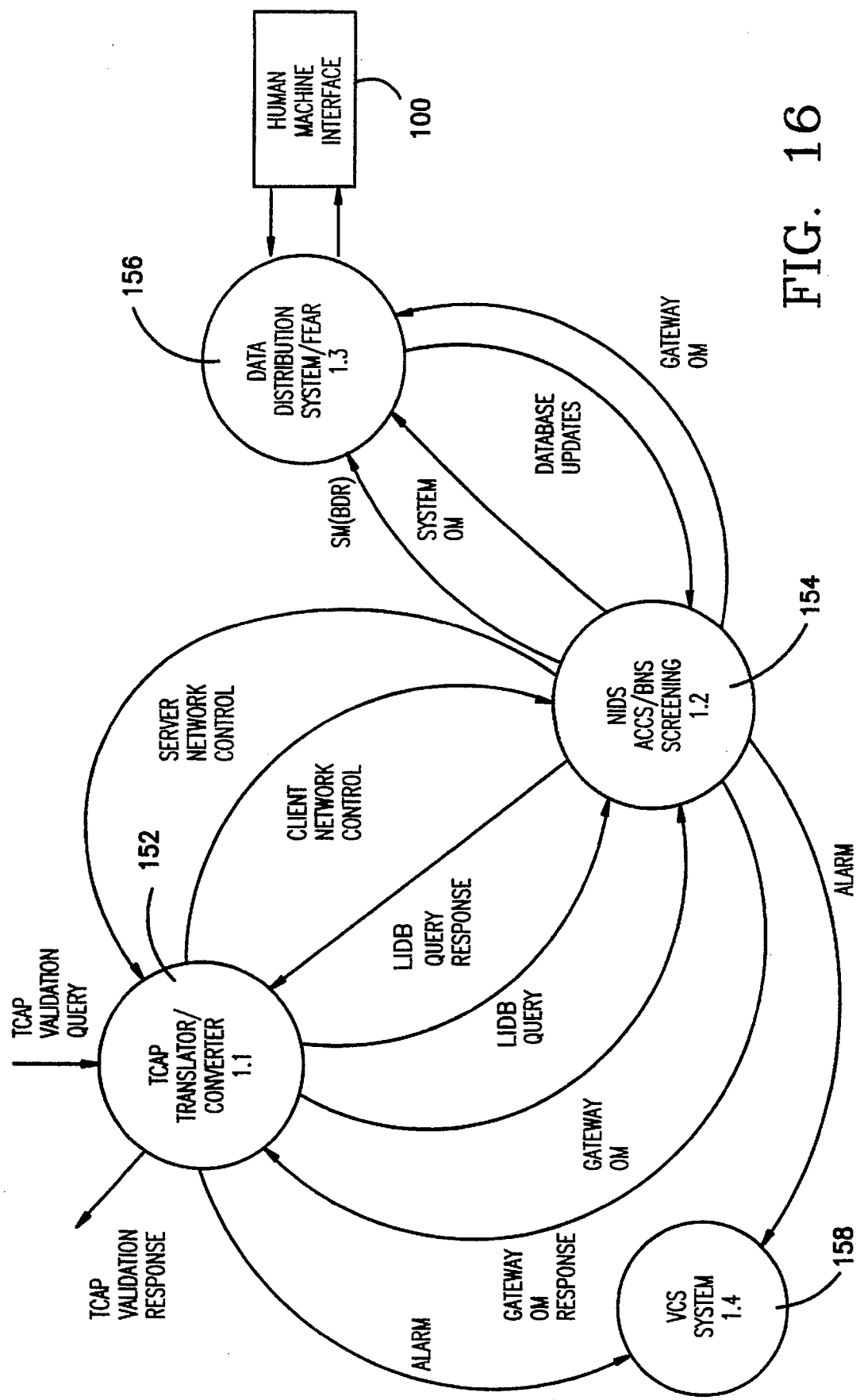
FIG. 16 is an illustration of the major components of the gateway of FIG. 5 and the data flow between the different components.

FIG. 16 illustrates the flow of data between the four major components of the present invention calling card validation system. As shown, gateway 152 is connected to receive the TCAP validation query and to output a TCAP validation response. To achieve this, it is connected by means of various responses and queries to NIDS ACCS/BNS screening server 154. Server 154 in turn is connected to the DDS system of the mainframe 156, which in turn is connected to the UI/HMI system 100. Also shown to be connected to gateway 152 and server 154 is the VCS system which receives alarms from gateway 152 and server 154.

Figure 17:
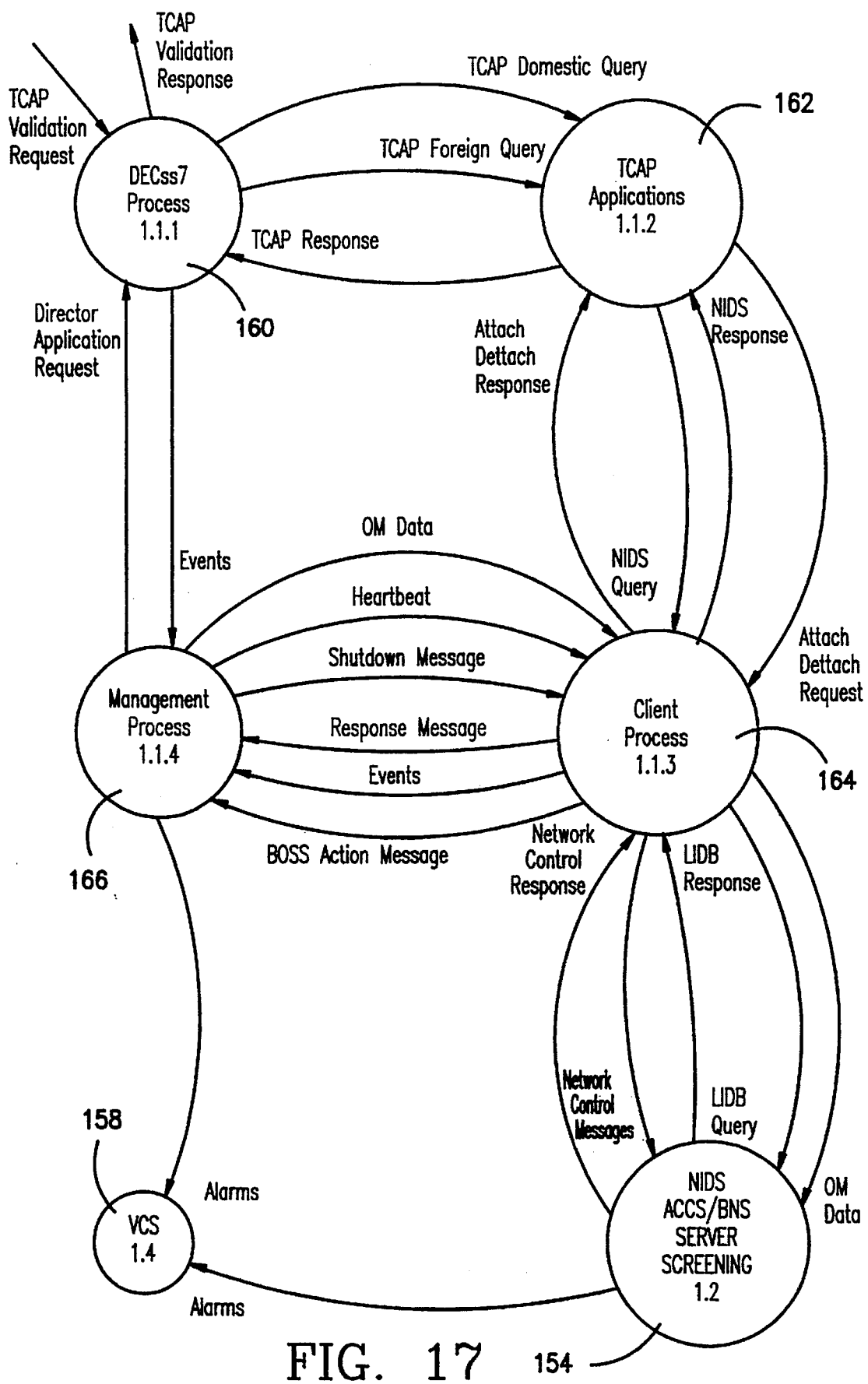
FIG. 17 is a diagram illustrating the subprocesses performed by the TCAP translator/converter module of FIG. 16 and the inter-relational data flow between the subprocesses.

FIG. 17 is a diagram illustrating the data flow of the gateway 152. Note that each of those circles, i.e. the process or application, are numbered 1.1X to indicate their dependency from the gateway circle shown in FIG. 16 which are designated by 1.1. As shown in FIG. 17, there are a number of functions or modules performed in the gateway of the instant invention. These functions namely correspond to the modules shown in FIG. 8 and are accordingly numbered the same. Do note however that server 154 is shown to be connected to the client process module 164. This is not surprising in view of the above discussion with respect to the interaction between the client process and the processing that takes place in the server. Further as shown, VCS system 158 receives alarms from both server 154 and gateway 152, more specifically from the management process 166 of the gateway system. The various queries, responses, messages and signals are self explanatory, particularly in view of the above discussion.

Figure 18:
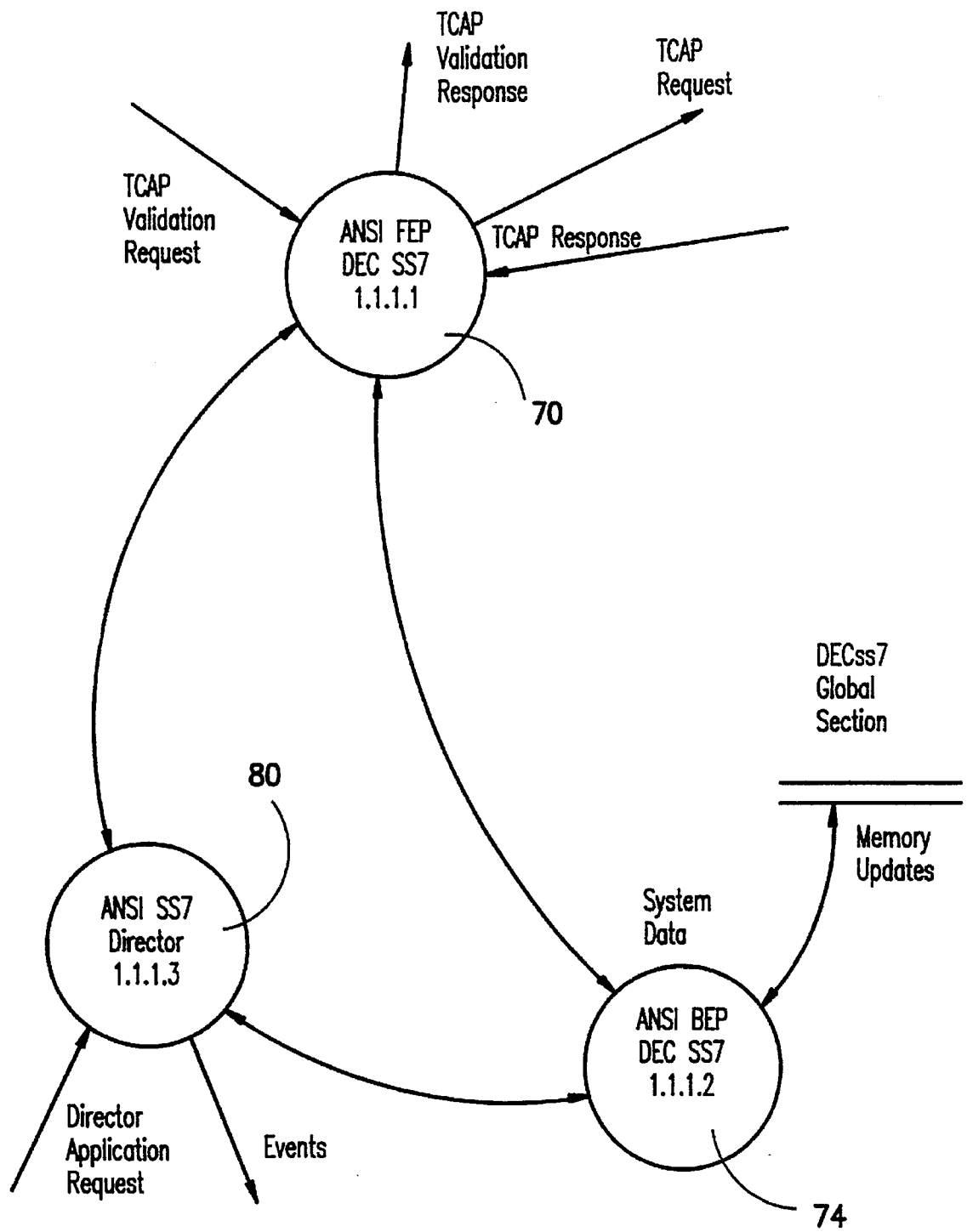
FIG. 18 is a more detailed illustration of the processes of the DEC SS7 process shown in FIG. 17.

FIG. 18 illustrates the flow of data between the front end processor 70, the back end processor 74 and the director system 80, as shown in FIG. 5 and further illustrated in FIG. 9.

Figure 19:
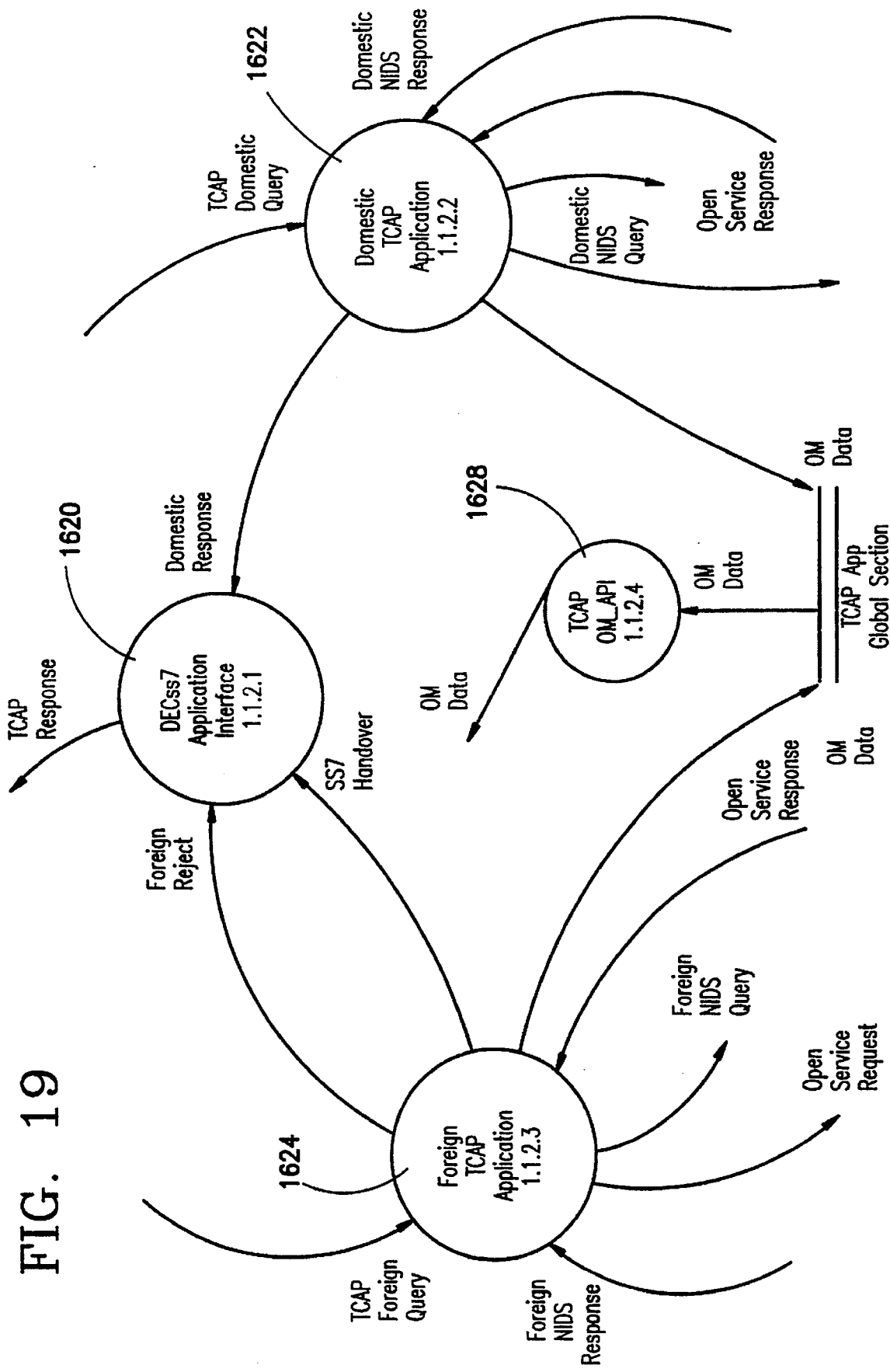
FIG. 19 is a more detailed illustration of the different processes performed under the TCAP application process of FIG. 17.

FIG. 19 describes the subprocesses that fall under the TCAP application process module 162 of the gateway system 152. With reference to FIG. 10 it can be seen that these processes are interrelated by means of the data flow thereinto. Although not shown to be connected thereto, client API processor 1626 of FIG. 10 is an integral portion of the TCAP application process module 162. And as further shown in FIG. 19, a function TCAP OM API 1628 receives OM data from the TCAP application global section, which in turn receives OM data from both the domestic TCAP applications process 1622 and the foreign TCAP application process 1624.

Figure 20:
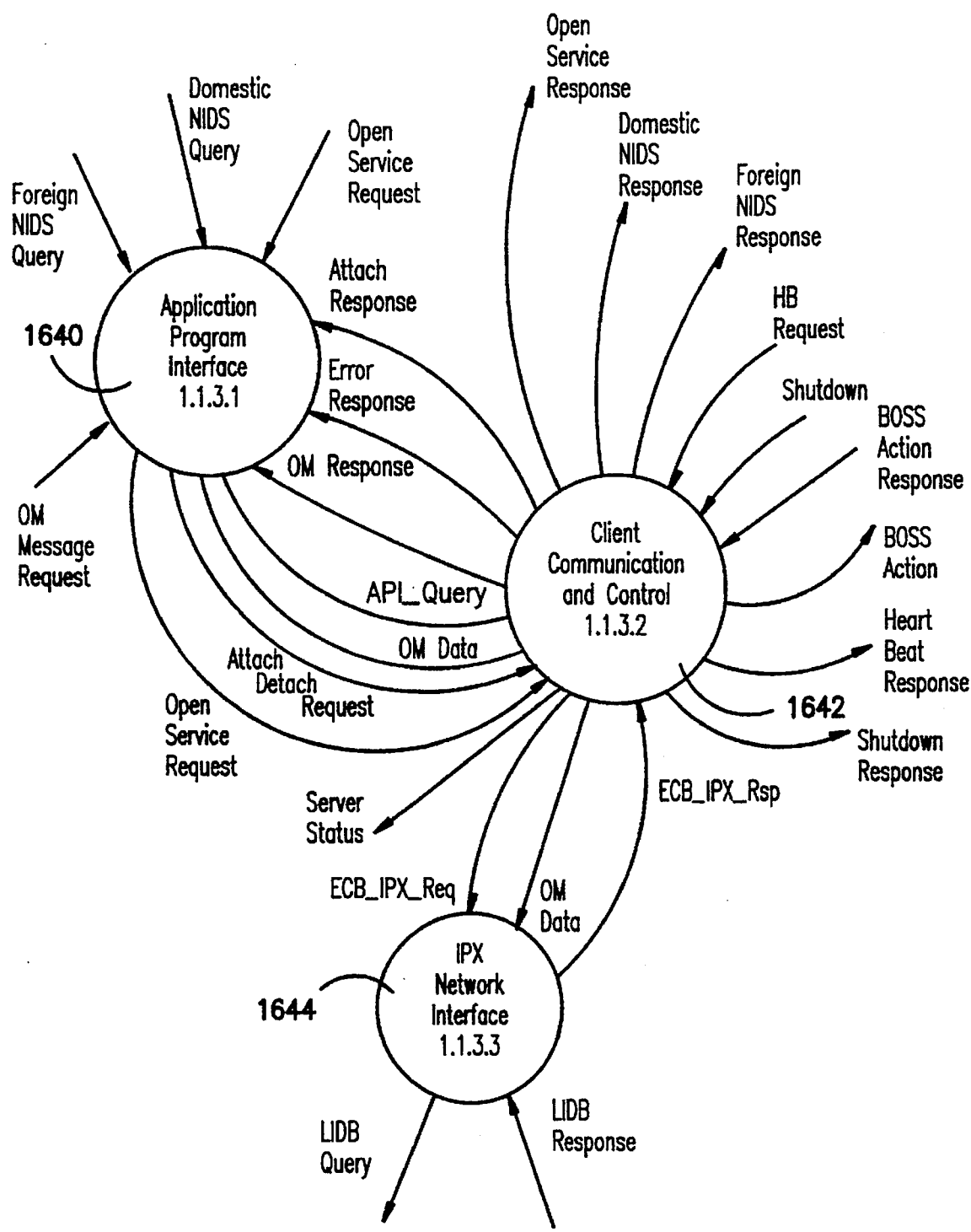
FIG. 20 is an illustration of the different processes performed in the client process of FIG. 17.

FIG. 20 is a diagram illustrating the data flow between the various subprocesses of the client process module 164. In particular, with reference to FIG. 11, it can be seen that the API sub-module 1640 is connected to the client communication in control sub-module 1642 by means of a number of data paths in terms of requests and responses. Client communication and control module 1642 in turn is shown to be connected to the IPX network interface module 1644.

Figure 21:
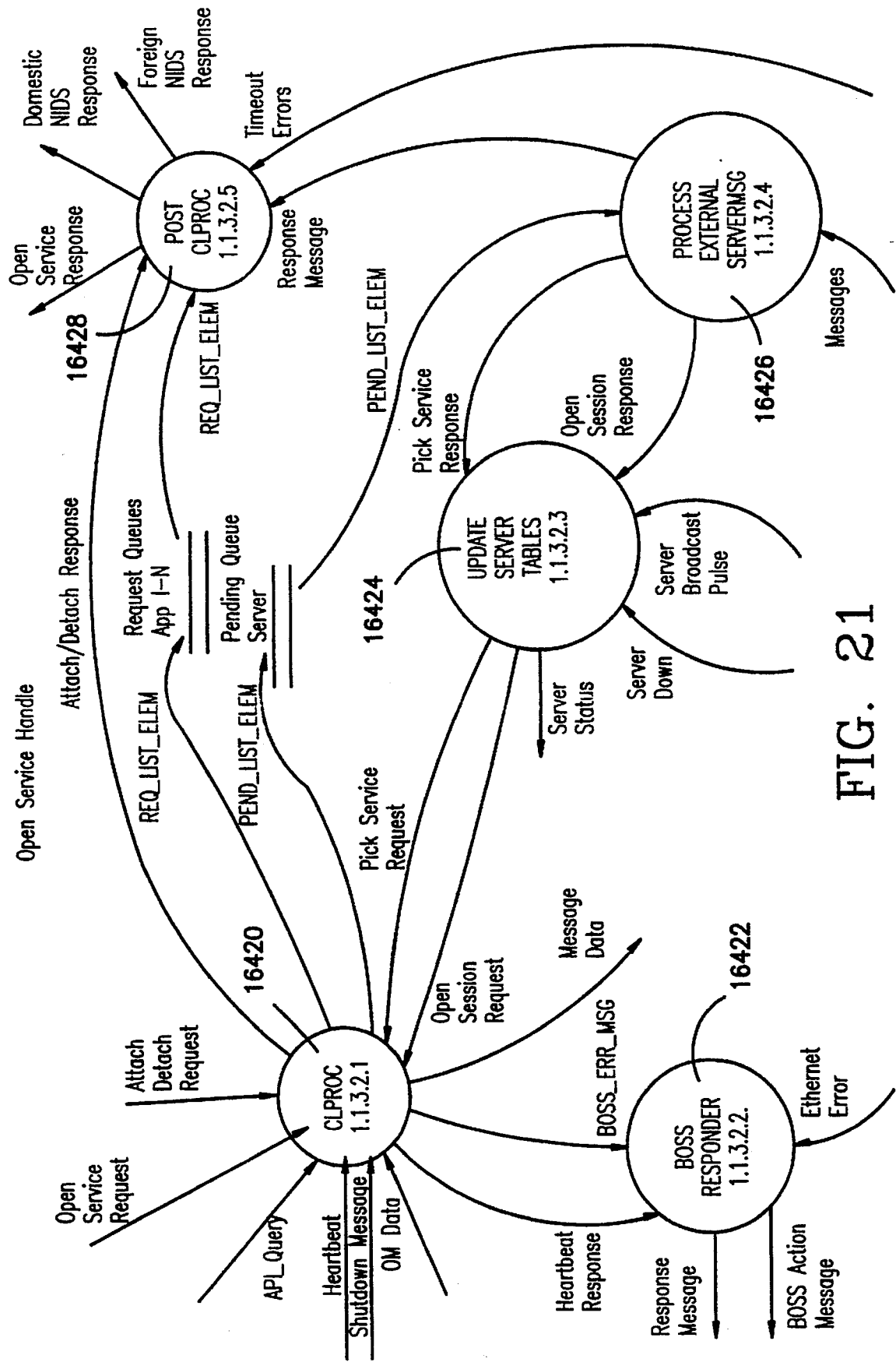
FIG. 21 is yet a further illustration of the different processes performed under the client communication and control process of FIG. 20.

FIG. 21 is a diagram illustrating the various subprocesses under the client communication and control process module 1642 and the data flow between these subprocesses. For example, as shown therein, CLPROC process 16420 is connected to BOSS responder process 16422 so that it can supply heartbeat response and BOSS message thereto. The CLPROX process also shown to provide information to the request queues and the pending queue server, as well as provide data to the post CLPROC process 16428. Also shown are updates server table process 16424 and process external server messenger process 16426.

Figure 22:
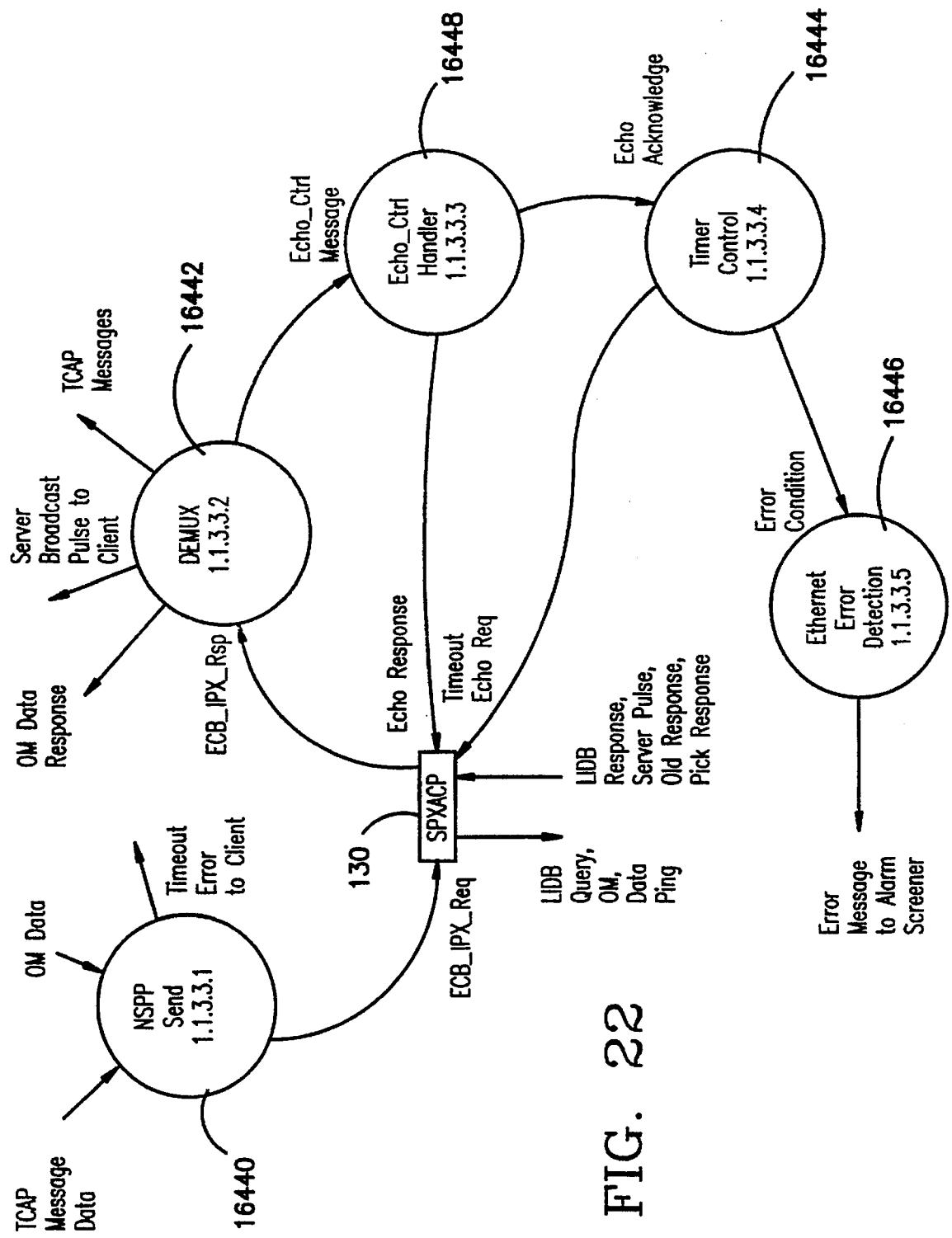
FIG. 22 is a more detailed illustration of the different processes performed under the IPX network interface process of FIG. 20.

FIG. 22 is a diagram illustrating the flow of data between the various processes operating under the IPX network interface module 1644 as shown in FIG. 11. It can be seen in FIG. 22 that the NSPP send process 16440 provides a request to SPXACP system 130 so that LIDB queries can be sent out to the file server. Likewise, SPXACP system 130 is shown to receive the LIDB response, among other signals. Further shown in FIG. 22 is the demux process 16442, the echo control handler process 16448, the timer control process 16444, and the ethernet error detector process 16446.

Figure 23:
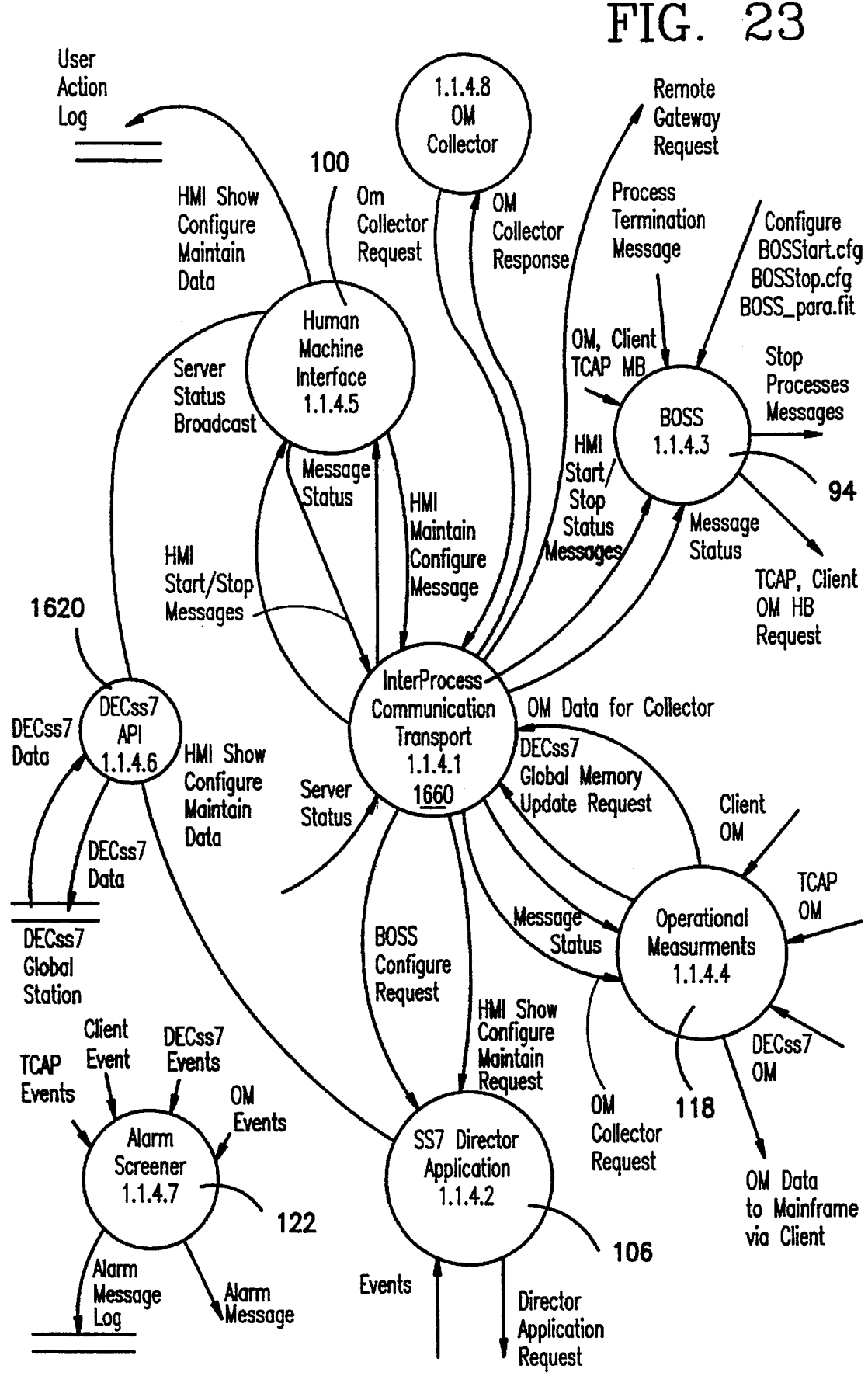
FIG. 23 illustrates the different processes performed under the management process shown in FIG. 17.

FIG. 23 is a diagram illustrating the flow of data between the various processes under the management process module 166. More specifically, the various processes and the flow of data shown in FIG. 23 correspond to the hierarchal diagram of FIG. 12. As shown in FIG. 23, the process is central to the various flow of data in the inter-process communication transport process 1660. Connected to the process are various processes and modules such as BOSS module 94, HMI process 100, operational measurement process 118, and SS7 director application process 106. Also shown is SS7 API process 1620 to which the director application process needs to send configuration file data to. Also shown is alarm screener 122 which receives events from the various processes.

Figure 24:
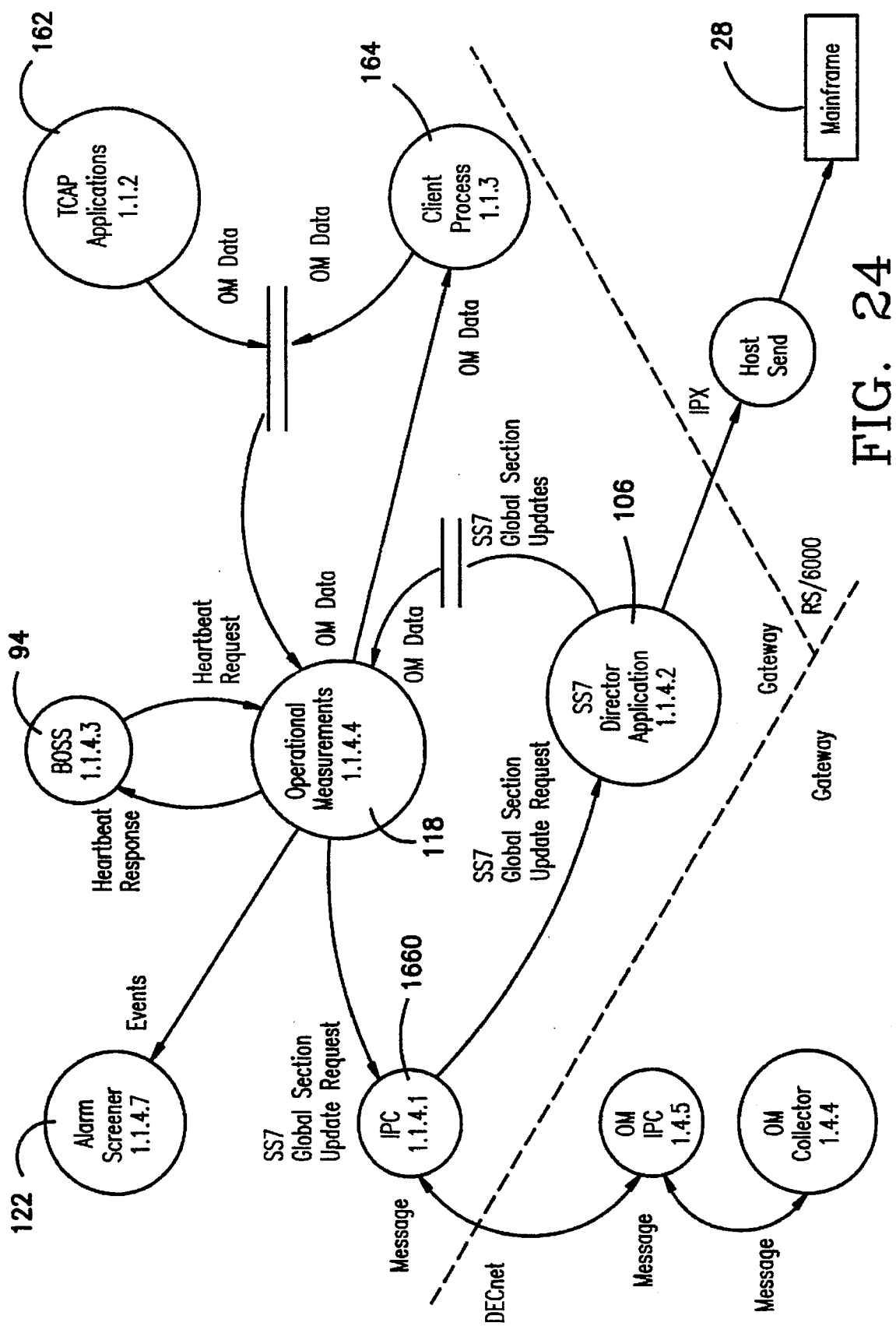
FIG. 24 is a functional illustration of the relationship between the various processes shown in FIGS. 17–23.

FIG. 24 is a drawing illustrating the various processes and the exchange of data between those processes as they relate to the gateway, the server and the mainframe. With reference to FIG. 5, FIG. 24 shows the operational measurements system 118 providing information to the IPC (inter-process communication process) 1660, which in turn provides the global section update request to the director application system 106. The director application system 106 then forwards the information to the file server 22 (FIG. 1) as indicated by the RS/6000 and the host send process which in turn forward it to the mainframe 28. Also shown are the OM IPC process and the OM collector process. The alarm screener 122 is also shown to receive the various events from the operational measurement process 118. There is furthermore shown the client process module 164 and the TCAP applications module 162. The BOSS system 94 is shown to monitor the process by sending a heartbeat request and receiving a heartbeat response.

FIG. 25 is the exemplar screen which shows the various sub-menus discussed above in conjunction with FIG. 14.

Inasmuch as the present invention is subject to many variations, modification and changes in detail, it is intended that all matters described throughout this specification and shown in the accompanying drawings be interpreted as illustrative only and not in a limiting sense. Accordingly, it is intended that the invention be limited only by the spirit and scope of the appended claims.

We claim:

1. A method of enabling a first telephone service provider to validate an account of a subscriber of another telephone service provider when said subscriber places a special service call with said first telephone service provider, comprising the steps of:

(a) prompting said subscriber to provide an account number when said special service call is placed;

(b) determining from said account number the telephone service provider of said subscriber;

(c) routing a message relating to said special service call to a node means through which at least messages relating to calls from said first telephone service provider may be routed to the telephone service provider of said subscriber;

(d) translating and converting, at said node means, the signaling protocol of said message relating to said special service call from the signaling protocol of said first telephone service provider to the signaling protocol of the telephone service provider of said subscriber if the signaling protocol of calls of said first telephone service provider is different from the signal protocol of calls of the telephone service provider of said subscriber; and (e) routing a query of said special service call having the converted signaling protocol to the telephone service provider of said subscriber to ascertain the validity of said account number.

2. The method of claim 1, wherein step (c) further comprises the step of:

sending a validation request in the form of a Transaction Capabilities Application Part (TCAP) message to said node.

3. The method of claim 2, wherein the telephone service provider of said subscriber comprises Automated Calling Card Service/Billed Number (ACCS/BNS) screening, wherein said step (d) further comprises the step of:

formatting said TCAP message into a Line Information Database (LIDB) query to be forwarded to said screening means.

4. The method of claim 1, wherein said signaling protocol of said first telephone service provider is a SS7 protocol, and wherein said step (d) further comprises the steps of:

processing functions relating to a Transaction Capabilities Application Part (TCAP), Signaling Connection Control Part (SCCP), and Message Transfer Part (MTP) of said SS7 protocol;

processing said query as a TCAP query;

converting said TCAP query into a NIDS (Network Information Distributed Service) Sequence Packet Protocol (NSPP) query compatible with the protocol of the telephone service provider of said subscriber.

5. The method of claim 4, further comprising the steps of:

comparing said account number with the account numbers stored in at least one database of the telephone service provider of said subscriber for ascertaining the validity of said account number.

6. A system for enabling a first telephone service provider to validate an account of a subscriber of another telephone service provider when said subscriber places a special service call with said first telephone service provider, comprising:

means for prompting said subscriber to provide an account number when placing said special service call;

means for determining from said account number the telephone service provider of said subscriber;

means for routing a message relating to said special service call to a node means through which at least messages relating to calls from said first telephone service provider may be routed to the telephone service provider of said subscriber;

wherein said node means includes:

means for translating and converting the signaling protocol of said special service call from the signaling protocol of said first telephone service provider to the signaling protocol of the telephone service provider of said subscriber if the signaling protocol of calls of said first telephone service provider is different from the signal protocol of calls of the telephone service provider of said subscriber; and means for forwarding a query relating to said special service call having the converted signaling protocol to the telephone service provider of said subscriber to ascertain the validity of said account number.

7. The system of claim 6, further comprising:

an Automated Calling Card Service/Billed Number (ACCS/BNS) screening means;

wherein the signaling protocol of said first telephone service provider is a SS7 protocol, and wherein said translating and converting means further converts a validation request sent to said node means in the form of a Transaction Capabilities Application Part (TCAP) message to a validation request in the form of a NIDS (Network Information Distributed Service) Sequence Packet Protocol (NSPP) message, said converted validation request being forwarded to said screening means to validate said account number.

8. The system of claim 6, wherein the telephone service provider of said subscriber comprises:

an Automated Calling Card Service/Billed Number (ACCS/BNS) screening means;

wherein said translating and converting means further formats said query into a Line Information Database (LIDB) query to be forwarded to said screening means.

9. The system of claim 6, wherein said signaling protocol of said first telephone service provider is a SS7 protocol, and wherein said translating and converting means further processes functions relating to a Transaction Capabilities Application Part (TCAP), Signaling Connection Control Part (SCCP), and Message Transfer Part (MTP) of said SS7 protocol, and converts said TCAP query into a NIDS (Network Information Distributed Service) Sequence Packet Protocol (NSPP) query compatible with the protocol of the telephone service provider of said subscriber.

10. The system of claim 6, wherein the telephone service provider of said subscriber comprises at least one database means whereat said account number corresponding to said query is compared with account numbers stored in said database means for ascertaining the validity of said account number.

11. A method of enabling different telephone service providers having respective different signaling protocols to validate subscriber accounts of different signaling protocols, comprising the steps of:

(a) obtaining an account number from a subscriber when said subscriber places a special service call;

(b) evaluating said account number to determine a telephone service provider associated with said account number;

(c) forwarding a message relating to said special service call to a node communicatively connected to said telephone service provider if said call did not originate with said telephone service provider;

(d) converting, at said node, the signaling protocol of said message relating to said special service call to the signaling protocol of said telephone service provider if the signaling protocol of the originating telephone service provider of said special service call is different from the signaling protocol provided to calls originating from said telephone service provider;

(e) forwarding a query relating to said special service call having the converted protocol to said telephone service provider to request validation of said account number.

12. The method of claim 11, further comprising the step of:

(f) comparing said account number of said special service call with account numbers provided by said telephone service provider to ascertain if said account number is valid.

13. The method of claim 11, wherein the signaling protocol of said special service call is a SS7 protocol, wherein said step (d) further comprises the step of:

converting said SS7 protocol to a NIDS (Network Information Distributed Service) Sequence Packet Protocol (NSPP).

14. The method of claim 11, wherein said step (e) further comprises the step of:

routing said query relating to said special service call having the converted signaling protocol to at least one database of said telephone service provider of said subscriber to ascertain the validity of said account number;

informing the service provider at which said special service call originated to complete connection of said special service call to its destination if said account number is determined to valid.

15. The method of claim 11, wherein said query forwarded to said telephone service provider is in the form of a Transaction Capabilities Application Part (TCAP) message.

16. The method of claim 12, wherein step (f) further comprises the step of:

comparing said account number of said special service call with the account numbers in at least one database to determine if to allow completion of said special service call.

17. The method of claim 14, wherein step (d) further comprises the step of:

formatting said query into a Line Information Database (LIDB) query to be forwarded to said database for screening.

18. A system for enabling different telephone service providers having respective different signaling protocols to validate subscriber accounts of different signaling protocols, comprising: means for obtaining an account number from a subscriber when said subscriber places a special service call;

means for evaluating said account number to determine a telephone service provider associated with said account number;

means for forwarding a message relating to said special service call to a node means communicatively connected to said telephone service provider if said call did not originate with said telephone service provider;

wherein said node means comprises:

means for converting the signaling protocol of said message relating to said special service call to the signaling protocol of said telephone service provider if the signaling protocol of the originating telephone service provider of said special service call is different from the signaling protocol provided to calls originating from said telephone service provider;

means for routing a query relating to said special service call having the converted protocol to said telephone service provider to request validation of said account number.

19. The system of claim 18, further comprising:

an Automated Calling Card Service/Billed Number (ACCS/BNS) screening means for comparing said account number of said special service call with account numbers provided by said telephone service provider to ascertain if said account number is valid.

20. The system of claim 18, wherein the signaling protocol of said special service call is a SS7 protocol; and wherein said converting means converts said SS7 protocol into a NIDS (Network Information Distributed Service) Sequence Packet Protocol (NSPP).

21. The system of claim 18, further comprising:

at least one database means containing a plurality of account numbers;

wherein said account number relating to said special service call having the converted signaling protocol is compared with said plurality of account numbers to ascertain the validity of said account number.

* * * * *